United States Patent
Seaman et al.

(10) Patent No.: US 6,262,977 B1
(45) Date of Patent: *Jul. 17, 2001

(54) HIGH AVAILABILITY SPANNING TREE WITH RAPID RECONFIGURATION

(75) Inventors: Michael John Seaman, Mountain View; Vipin K. Jain, Santa Clara, both of CA (US)

(73) Assignee: 3Com Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/141,803

(22) Filed: Aug. 28, 1998

(51) Int. Cl.[7] .................................................. H04L 12/28
(52) U.S. Cl. ............................ 370/256; 370/254; 370/401
(58) Field of Search ................................... 370/401, 408, 370/255, 256, 254, 428; 709/239, 242

(56) References Cited

U.S. PATENT DOCUMENTS 5,734,824 * 3/1998 Choi ...................................... 709/224
5,790,808 * 8/1998 Seaman ................................. 709/223
6,032,194 * 2/2000 Gai et al. .............................. 703/239

* cited by examiner

Primary Examiner—Douglas Olms
Assistant Examiner—Ken Vanderpuye
(74) Attorney, Agent, or Firm—McDonnell Boehnen Hulbert & Berghoff

(57) ABSTRACT

An improvement to the spanning tree protocol provides for identifying a port on the bridge in the alternate port role which qualifies as a next best root port. Upon detection of a failure at the root port, or other event causing a change in the root port to a blocking state, the next best root port transitions to the root port role, and forwarding state immediately without traversing the listening and learning states of the standard protocol. Also, in networks in which there is a possibility of shared media links between bridges, ports that have the alternate port role, and connect to a LAN which is also connected through a designated port on the same bridge are identified as a backup. The algorithm prevents such backup ports from transitioning to the forwarding state before the designated port connected to the same LAN segment transitions to a blocking state.

36 Claims, 21 Drawing Sheets

Standard Port Roles, States, and Transitions

| Port Role | Disabled Port | | | Root Port | | | |
|---|---|---|---|---|---|---|---|
| Port State | Disabled | Listening | Learning | Forwarding | Listening | Learning | Forwarding |
| forwarding? | No | No | No | Yes | No | No | Yes |
| learning? | No | No | Yes | Yes | No | Yes | Yes |
| Events | | | Transitions | | | | |
| become disabled | X | Disabled | Disabled | Disabled | Disabled | Disabled | Disabled |
| become root port | X | X | X | X | X | X | X |
| become designated | Designated Listening[a] | Designated Listening[c] | Designated Learning[c] | Designated Forwarding | | | |
| become alternate[9] | X | Alternate Blocking[d] | Alternate Blocking[d] | Alternate Blocking | | | |
| forward delay timer expiry | X | Root Port Learning[a] | Root Port Forwarding | | | | |

| Port Role | Designated Port | | | Alternate Port | | | |
|---|---|---|---|---|---|---|---|
| Port State | Listening | Learning | Forwarding | Blocking | Listening | Learning | Forwarding |
| forwarding? | No | No | Yes | No | No | No | Yes |
| learning? | No | Yes | Yes | No | No | Yes | Yes |
| Events | | | Transitions | | | | |
| become disabled | Disabled | Disabled | Disabled | Disabled | Disabled | Disabled | Disabled |
| become root port | Root Port Listening[c] | Root Port Learning[c] | Root Port Forwarding | Root Port Listening[a] | Root Port Listening[a] | Root Port Forwarding | |
| become designated | X | X | X | Designated Listening[a] | X | X | |
| become alternate[9] | Alternate Blocking[d] | Alternate Blocking[d] | Alternate Blocking | | | | |
| forward delay timer expiry | Designated Learning[a] | Designated Forwarding | | | | | |

FIG. 3A

Standard Port States and Transitions

| Port State | Disabled | Listening | Learning | Forwarding | Blocking |
|---|---|---|---|---|---|
| forwarding? | No | No | No | Yes | No |
| learning? | No | No | Yes | Yes | No |
| Events | | | Transitions | | |
| become disabled | X | Disabled | Disabled | Disabled | Disabled |
| become root port | X | — | — | — | Listening[a] |
| become designated | Listening[a] | — | — | — | Listening[a] |
| become alternate | X | Blocking[d] | Blocking[d] | Blocking | — |
| forward delay timer expiry | X | Learning[a] | Forwarding | X | X |

FIG. 3B

Port Roles and States, with enhanced transitions for point-to-point networks only

| Port Role | Disabled Port | Root Port | Designated Port | | | Alternate Port |
|---|---|---|---|---|---|---|
| Port State | Disabled | Forwarding | Listening | Learning | Forwarding | Blocking |
| forwarding? | No | Yes | No | No | Yes | No |
| learning? | No | Yes | No | Yes | Yes | No |
| Events | Transitions | | | | | |
| become disabled | X | Disabled | Disabled | Disabled | Disabled | Disabled |
| become root port | X | X | Root Port Forwarding | Root Port Forwarding | Root Port Forwarding | Root Port Forwarding |
| become designated1[10] | Designated Listening[a] | Designated Listening[a] | X | X | X | Designated Listening |
| become designated2[11] | Designated Listening[a] | Designated Forwarding | X | X | X | Designated Listening |
| become alternate[12] | X | Alternate Blocking | Alternate Blocking[d] | Alternate Blocking[d] | Alternate Blocking | X |
| forward delay timer expiry | X | X | Designated Learning[a] | Designated Forwarding | X | X |

FIG. 4A

Port States, with enhanced transitions for point-to-point networks only

| Port State | Disabled | Listening | Learning | Forwarding | Blocking |
|---|---|---|---|---|---|
| forwarding? | No | No | No | Yes | No |
| learning? | No | No | Yes | Yes | No |
| Events | | | Transitions | | |
| become disabled | X | Disabled | Disabled | Disabled | Disabled |
| become root port | X | Forwarding | Forwarding | — | Forwarding |
| become designated1 | Listening[a] | — | — | — | Listening[a] |
| become designated2 | Listening[a] | — | — | — | Listening[a] |
| become alternate | X | Blocking[d] | Blocking[d] | Blocking | X |
| forward delay timer expiry | X | Learning[a] | Forwarding | X | X |

FIG. 4B

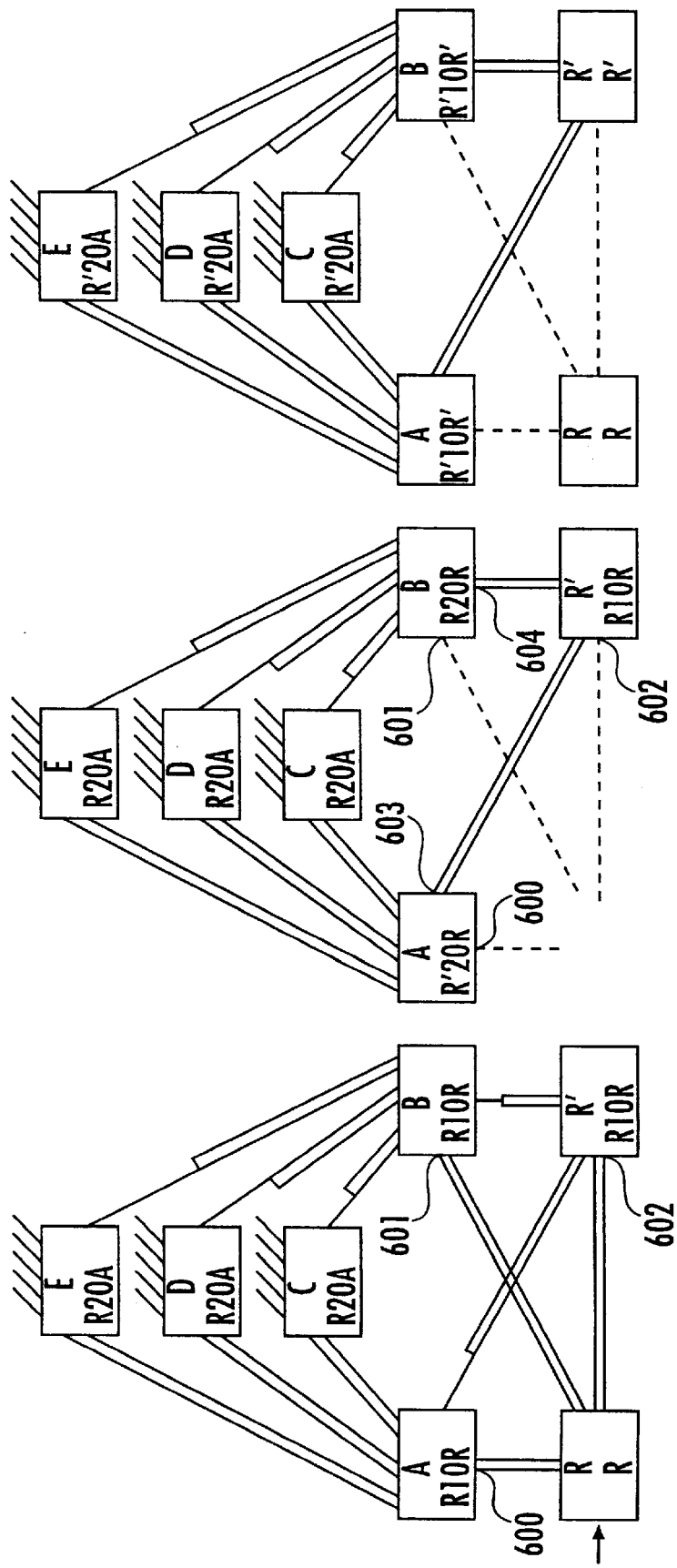

(1) BECOME ENABLED
(2) BECOME DISABLED
(3') BECOME DESIGNATED WHEN NEW ROOT NOT PREVIOUSLY FORWARDING
(3") BECOME DESIGNATED WHEN NEW ROOT PREVIOUSLY FORWARDING
(4') BECOME ALTERNATE
(4") BECOME BACKUP
(5) FORWARD DELAY TIMER EXPIRY
(6) BECOME ROOT

Enhanced Port Roles, States, with transitions for both point-to-point and shared media networks

| Root Port | Disabled Port | Root Port | | | Designated Port (cont. over) | |
|---|---|---|---|---|---|---|
| Port State | Disabled$_b$ | Listening$_r$ | Learning | Forwarding | Listening$_r$ | Listening |
| forwarding? | No | No | No | Yes | No | No |
| learning? | No | No | Yes | Yes | No | No |
| Events | | | Transitions | | | |
| become disabled | X | Disabled$_b^d$ | Disabled$_b^d$ | Disabled$_b$ | Disabled$_b^d$ | Disabled$_b^d$ |
| become root port | X | X | X | X | Root Port Listening$_r^c$ | Root Port Forwarding$^d$ |
| become designated1[13] | Designated Listening$_r^a$ | Designated Listening$_r^b$ | Designated Listening$^b$ | Designated Listening$^a$ | X | X |
| become designated2[14] | Designated Listening$_r^a$ | Designated Listening$_r^c$ | Designated Learning$^c$ | Designated Forwarding | X | X |
| become alternate | X | Alternate Blocking$^c$ | Alternate Blocking$^d$ | Alternate Blocking | Alternate Blocking$^c$ | Alternate Blocking$^d$ |
| become backup | X | Backup Blocking$_b^d$ | Backup Blocking$_b^d$ | Backup Blocking$_b$ | Backup Blocking$_b^c$ | Backup Blocking$_b^d$ |
| forward delay timer expiry | X | Root Port Learning$^a$ | Root Port Forwarding | X | Designated Learning$^a$ | Designated Learning$^a$ |

FIG. 12A

| Designated Port | | Alternate Port | | Backup Port |
|---|---|---|---|---|
| Learning | Forwarding | Blocking$_r$ | Blocking | Blocking$_b$ |
| No | Yes | No | No | No |
| Yes | Yes | No | No | No |
| Transitions | | | | |
| Disabled$_b^d$ | Disabled$_b$ | Disabled$_b^d$ | Disabled$_b$ | Disabled$_b$ |
| Root Port Forwarding$^d$ | Root Port Forwarding | Root Port Listening$_r^b$ | Root Port Forwarding | Root Port Listening$_r^a$ |
| X | X | Designated Listening$_r^b$ | Designated Listening$^a$ | Designated Listening$_r^a$ |
| X | X | Designated Listening$_r^b$ | Designated Listening$^a$ | Designated Listening$_r^a$ |
| Alternate Blocking | Alternate Blocking | X | X | Alternate Blocking$_r^a$ |
| Backup Blocking$_b^d$ | Backup Blocking$_b$ | Backup Blocking$_b^d$ | Backup Blocking$_b$ | — |
| X | X | Alternate Blocking | X | X |
| Designated Forwarding | | | | |

FIG. 12B

Enhanced States, and Transitions for both point-to-point and shared media networks

| Port State | Disabled$_b$ | Listening$_r$ | Listening | Learning | Forwarding | Blocking$_r$ | Blocking | Blocking$_b$ |
|---|---|---|---|---|---|---|---|---|
| forwarding? | No | No | No | No | Yes | No | No | No |
| learning? | No | No | No | Yes | Yes | No | No | No |
| Events | | | | Transitions | | | | |
| become disabled | X | Disabled$_b^d$ | Disabled$_b^d$ | Disabled$_b^d$ | Disabled$_b$ | Disabled$_b^d$ | Disabled$_b$ | Disabled$_b$ |
| become root port | X | — | Forwarding$^d$ | Forwarding$^d$ | — | Listening$_r^d$ | Forwarding | Listening$_r^a$ |
| become designated1 | Listening$_r^a$ | Listening$_r^a$ | Listening$^a$ | Listening$^a$ | Listening$^a$ | Listening$_r^b$ | Listening$^a$ | Listening$_r^a$ |
| become designated2 | Listening$_r^a$ | — | — | — | — | Listening$_r^b$ | Listening$^a$ | Listening$_r^a$ |
| become alternate | X | Blocking$_r$ | Blocking | Blocking | Blocking | — | — | Blocking$_r$ |
| become backup | X | Blocking$_b^b$ | Blocking$_b^b$ | Blocking$_b^b$ | Blocking$_b$ | Blocking$_b^d$ | Blocking$_b$ | X |
| forward delay timer expiry | X | Learning$^a$ | Learning$^a$ | Forwarding | X | Blocking | X | X |

FIG. 12C

Further enhanced Port Roles, States, with transitions for both point-to-point and shared media networks[15]

| Root Port | | | | | Designated Port (cont. over) | | |
|---|---|---|---|---|---|---|---|
| Port State | Disabled$_b$ | Listening$_r$ | Learning | Forwarding | Listening$_r$ | Listening$_r$ | Listening |
| forwarding? | No | No | No | Yes | No | No | No |
| learning? | No | No | Yes | Yes | No | No | No |
| Events | | | | Transitions | | | |
| become disabled | X | Disabled$_b^d$ | Disabled$_b^d$ | Disabled$_b$ | Disabled$_b^d$ | Disabled$_b^d$ | Disabled$_b^d$ |
| become root port | X | X | X | X | Root Port Listening$_r^c$ | Root Port Listening$_r^c$ | Root Port Forwarding |
| become designated1[16] | Designated Listening$_r^a$ | Designated Listening$^b$ | Designated Listening$^b$ | Designated Listening$^a$ | X | X | X |
| become designated2[17] | Designated Listening$_r^a$ | Designated Listening$_r^c$ | Designated Learning$^c$ | Designated Forwarding | X | X | X |
| become alternate | X | Alternate Blocking$^c$ | Alternate Blocking$^d$ | Alternate Blocking | Alternate Blocking$_r^c$ | Alternate Blocking$_r^c$ | Alternate Blocking |
| become backup | X | Backup Blocking$_b^d$ | Backup Blocking$_b^d$ | Backup Blocking$_b$ | Backup Blocking$_b^d$ | Backup Blocking$_b^d$ | Backup Blocking$_b^d$ |
| forward delay timer expiry | X | Root Port Learning$^a$ | Root Port Forwarding | X | Designated Learning$^a$ | Designated Learning$^a$ | Designated Learning$^a$ |
| forgetting timer expiry | X | X | X | X | X | X | X |

FIG. 14A

|  | Designated Port | | Alternate Port | | | Backup Port |
|---|---|---|---|---|---|---|
|  | Learning | Forwarding | Blocking$_f$ | Blocking$_r$ | Blocking | Blocking$_b$ |
|  | No | Yes | No | No | No | No |
|  | Yes | Yes | No | No | No | No |
| Transitions | | | | | | |
| Disabled$_b^d$ | Disabled$_b$ | Disabled$_b$ | Disabled$_b^f$ | Disabled$_b^d$ | Disabled$_b$ | Disabled$_b$ |
| Root Port Forwarding$^d$ | Root Port Forwarding | Root Port Forwarding | Root Port Forwarding$^f$ | Root Port Listening$_r^b$ | Root Port Forwarding | Root Port Listening$_r^a$ |
| X | X | X | Designated Listening$^{af}$ | Designated Listening$_r^b$ | Designated Listening$^a$ | Designated Listening$_r^a$ |
| X | X | X | Designated Forwarding$^f$ | Designated Listening$_r^b$ | Designated Listening$^a$ | Designated Listening$_r^a$ |
| Alternate Blocking$^d$ | Alternate Blocking$_f$ | Alternate Blocking$_f$ | X | X | X | Alternate Blocking$_r^a$ |
| Backup Blocking$_b^d$ | Backup Blocking$_b$ | Backup Blocking$_b$ | Backup Blocking$_b^f$ | Backup Blocking$_b^d$ | Backup Blocking$_b$ | — |
| Designated Forwarding | X | X | X | Alternate Blocking | X | X |
| X | X | X | Blocking | X | X | X |

FIG. 14B

Further enhanced States, and Transitions for both point-to-point and shared media networks

| Port State | Disabled$_b$ | Listening$_r$ | Listening | Listening | Learning | Forwarding |
|---|---|---|---|---|---|---|
| forwarding? | No | No | No | No | No | Yes |
| learning? | No | No | No | No | Yes | Yes |
| Events | | | Transitions | | | |
| become disabled | X | Disabled$_b^d$ | Disabled$_b^d$ | Disabled$_b^d$ | Disabled$_b^d$ | Disabled$_b$ |
| become root port | X | — | — | Forwarding$^d$ | Forwarding$^d$ | — |
| become designated1 | Listening$_r^a$ | Listening$_r^a$ | Listening$^a$ | Listening$^a$ | Listening$^a$ | Listening$^a$ |
| become designated2 | Listening$_r^a$ | — | — | — | — | — |
| become alternate | X | Blocking$_r$ | Blocking | Blocking | Blocking | Blocking$_f^e$ |
| become backup | X | Blocking$_b^d$ | Blocking$_b^d$ | Blocking$_b^d$ | Blocking$_b^d$ | Blocking$_b$ |
| forward delay timer expiry | X | Learning$^a$ | Learning$^a$ | Forwarding | Forwarding | X |
| forgetting timer expiry | X | X | X | X | X | X |

FIG. 14C

| | Transitions | | | |
|---|---|---|---|---|
| | Blocking$_f$ | Blocking$_r$ | Blocking | Blocking$_b$ |
| | No | No | No | No |
| | No | No | No | No |
| | Disabled$_b$ | Disabled$_b^d$ | Disabled$_b$ | Disabled$_b$ |
| | Forwarding$^f$ | Listening$_r^b$ | Forwarding | Listening$_r^a$ |
| | Listening$^{af}$ | Listening$_r^b$ | Listening$^a$ | Listening$_r^a$ |
| | Forwarding$^f$ | Listening$_r^b$ | Listening$^a$ | Listening$_r^a$ |
| | — | — | — | Blocking$_r$ |
| | Blocking$_b^f$ | Blocking$_b^d$ | Blocking$_b$ | X |
| | X | Blocking | X | X |
| | Blocking | X | | X |

FIG. 14D

HIGH AVAILABILITY SPANNING TREE WITH RAPID RECONFIGURATION

BACKGROUND OF THE INVENTION

1. Field of the Invention

The present invention relates to network protocols and network intermediate devices executing such protocols; and more particularly to algorithms for managing a tree of network devices for a data network according to a spanning tree protocol.

2. Description of Related Art

Local area networks LANs specified according to IEEE Standards for Local and Metropolitan Area Networks under section 802.x of all types may be connected together with media access control MAC bridges. Bridges interconnect LAN segments so that stations connected to the LANs operate as if they were attached to a single LAN for many purposes. Thus a bridged local area network provides for interconnection of stations attached to LAN segments of different MAC types, for an increase in the physical extent, the number of permissible attachments and the total performance of a LAN, and for the partitioning of physical LAN support for administrative or maintenance reasons. The MAC bridge is specified according to the IEEE standard 802.1D (IEEE Std 802.1D-1990, IEEE Standards for Local and Metropolitan Area Networks: Media Access Control (MAC) Bridges.)

When a bridged network is established, it is possible to create loops in the network by providing more than one path through bridges and LAN segments between two points. Thus, according to the 802.1D standard, an active topology for the bridged network is maintained according to the spanning tree protocol which is described in the standard. The spanning tree protocol automatically establishes a fully connected (spanning) and loop-free (tree) bridged network topology. It uses a distributed algorithm that selects a root bridge and the shortest path to that root from each LAN. Tie breakers are used to ensure that there is a unique shortest path to the root, while uniqueness of the root is guaranteed by using one of its MAC addresses as part of a priority identifier.

Every LAN in the network has one and only one "designated port" providing that LANs shortest path to the root, through the bridge of which the designated port is a part. The bridge is known as the designated bridge for that LAN.

Thus, bridges other than the root bridge at the root of the network can be termed a branch bridge. Every branch bridge has a "root port" which is the port providing that bridge's shortest path to the root. Ports other than the root port are designated ports, or alternate ports according to the standard. An alternate port is connected to a LAN that for which another bridge is the designated bridge, and is placed in a blocking state so that frames are not forwarded through that port.

The frame forwarding path through any bridge is thus between its root port and designated ports. When spanning tree information has been completely distributed and is stable, this connectivity will connect all of the LANs in a loop free tree.

When a bridge first receives spanning tree information that dictates new connectivity through that bridge, it does not establish the new connectivity immediately. Ports that were connected previously as either the root port or a designated port, but are no longer to be connected, are immediately made blocking. However the transition to a forwarding state of ports that were previously not connected in a forwarding role is delayed. The delay serves two purposes:

(a) Frames forwarded on the previous topology may still be buffered by bridges in the network. Thus an instantaneous bridge to the new topology can cause these to be forwarded back to their LAN of origin, causing duplication of the frame once.

(b) New spanning tree information in the network may not have been filly distributed yet. Thus an immediate change to a new topology may cause temporary loops. These loops could generate high traffic volumes, disrupting end stations, causing frame loss in bridges, and possibly delaying the propagation of spanning tree information further.

The first of these two reasons (a), is far less important than it once was, since the protocols prevalent on LANs today deal with immediately duplicated frames. Some old implementations of LLC type 2 will reset connection under these circumstances, but they are no longer in wide spread deployment. Thus the issue presented by reason (a) is less important.

Reason (b) continues to be a fundamental to the spanning tree configuration.

According to the spanning tree protocol of the standard, each port on a bridge can assume a blocking state in which frames are not forwarded through the port, a forwarding state in which frames are forwarded through the port. For a transition from the blocking state to the forwarding state, the protocol requires the port to proceed through transitional states referred to as the listening state and the learning state. In the listening state, the port is preparing to participate in frame relay, however frame relay is temporarily disabled to prevent temporary loops. In the listening state, the port monitors bridge protocol data unit (BPDU) frames or other information related to the topology in the network for an interval referred to as the forward delay timer. If no information is received which causes a change in state of the port before expire of the forward delay timer, then the port transitions to the learning state.

In the learning state, the port continues to prepare for participation in frame relay. The relay is temporarily disabled to prevent loops. In this state, in addition to monitoring BPDU frames and other information related to operation of the spanning tree algorithm, the port learns information about end stations that are accessible through the port for use in the forwarding of frames once the frame enters the forwarding state. Upon expiration of the forward delay timer in the learning state, if no better information about the protocol is received, then the port assumes the forwarding state. Thus, the transition from a blocking state to the forwarding state takes two times the forward delay timer interval. From the time of detection of a change in topology causing a transition from the blocking to the forwarding state, until the time in which the forwarding state is assumed can be a significant amount of time, as much as 20 to 50 seconds in some cases.

For background information consider bridge initialization, the addition of a link, and link failure situations according to the spanning tree protocol.

On bridge initialization, the bridge becomes the Root (with root path cost of zero). The root port identity stored by the bridge is reserved (value 0). All the ports on the bridge become designated ports for the respective segments and go through the transition (blocking→listening→learning) before they start forwarding data packets. A BPDU is generated on all the connected ports with the advertising bridge as the root as well as designated bridge and with the transmitting port as the designated port for the segment.

On each segment, if the advertising bridge is the highest priority (higher priority than that recorded as the designated root by the receiving port), the receiving port updates the root and designated bridge information (the root bridge, root path cost, designated bridge, and designated port) and starts the message age timer. The root information (the root bridge and root path cost) is updated on the receiving bridge. The designated ports are selected next relative to the new root information. The designated ports should remain designated and update their root and designated bridge information while some blocked ports might become designated now as a result of receiving information from a higher priority bridge. The blocked ports go through the transition (blocked→listening→learning) before they start forwarding data packets. If this new information is heard on the root port by a receiving bridge, it generates a configuration BPDU to be sent out on all the designated ports with the new root information. This way new root information is propagated along all branches of spanning tree and after a while all the bridges have a consistent view of the Root and corresponding root path costs.

If the advertising bridge has lower priority than the designated root recorded on the segment, only the designated bridge/port responds with the correct (superior) information. Once the correct (better) information is heard back by the advertising bridge, it updates the root and designated bridge information on all the ports as described in the above paragraph. If the spanning tree topology was stable before the advertising bridge came on line, only one response from one of the neighbors (designated bridge) should bring the advertising bridge in sync with other bridges regarding the Root identity. The first receiving port becomes the new root port and all other ports as the designated ports. Then the advertising bridge transmits a configuration BPDU on all the (now) designated ports advertising the newly learned root and root path cost. If the new information is better than that recorded previously on a segment, it replaces the old information and propagated further. Otherwise, the designated bridge responds and eventually all the ports move to the right status (alternate/designated/root).

As can be seen, good information is propagated quickly throughout the spanning tree. But, no forwarding takes place before ports go into forwarding state (blocking→listening→learning→forwarding).

On addition of a link, (or on port enablement) the port to which the link is added becomes the designated port for the connected segment and goes through the transition (blocking→listening→learning) before it starts forwarding data packets. The port takes the designated root and root path cost information from the bridge. Next time around when the bridge receives a hello packet on the root port, a hello packet is also generated for this new designated port. If there is another bridge on the connected segment providing better root path information, it responds and the usual designated bridge/port selection process takes place. If the received information is better than the current root information, root port and designated ports selection takes place. This process continues downstream until all the bridges have learned about the better root information. However, no forwarding takes place before the port goes into forwarding state (blocking→listening→learning). So, essentially the connectivity is established after 2*forward delay time (~30 seconds).

If a link failure occurs on the root port, the bridge reconfigures itself. Otherwise, the link failure (designated/blocked port) is ignored. Failure of a blocked port doesn't do any harm, but a designated port failure on a bridge indirectly affects its neighbors. Those neighbors who reach the root through the failed designated port, i.e., whose root port is on the same segment, eventually time out the information learned on the root port (through the message age timer expire). Once the message age timer expires, the bridge reconfigures itself. Reconfiguration can happen immediately following the root port failure (loss of linkbeat) or after the message age timer on the root port expires.

Reconfiguration of a bridge involves selecting the root port and designated ports. The root port is chosen from among the blocked ports providing the best root information. The bridge root information (designated root and root path cost) is updated with the information learned on this new root port. The designated ports are selected next relative to this new root port. In a stable topology, all the existing designated ports remain designated although their root information is updated with the now inferior information. As long as the Root Bridge doesn't fail, all the remaining blocked ports remain blocked since their connected segments already have better paths to the root. The blocked port that was upgraded to root port status goes through the transition (blocking→listening→learning→forwarding) before it actually starts forwarding data packets. A forward delay timer is started on this port. If this bridge is not the Root Bridge, it will receive the hello packet from the Root periodically and will transmit that on all the designated ports. Any neighbor whose root port lies on the connected segment ignores this inferior root information. Since the root information is not updated on the root port of the neighboring bridges, the message age timer eventually expires. When the timer expires, the corresponding root port becomes the designated port and the neighboring bridge reconfigures itself.

Since the message age timer is synchronized in the spanning tree, it should expire at around the same time in all the downstream bridges. These bridges make the corresponding root ports designated and select a new root port (from among the blocked ports) and start advertising the root information. On a segment, the bridge with the best root information wins (becomes the designated bridge), other ports on this segment either become root ports or are blocked.

If the root port fails on a bridge, the bridge can immediately select a new root port, which then goes through the transition. If the topology is such that this new root port remains a root port, this port can go into forwarding after 2*forward delay timer (assuming no propagation and processing delays). In case one of the designated ports becomes the root port (after neighbors speak up), partial connectivity will be restored after message age time. If any of the blocked ports becomes designated then connectivity through that port will be restored after 2*forward delay time. Other bridges in the network can take anywhere from message age time (if the root port remains the same or one of the designated ports becomes the root port) to message age time+2*forward delay timer time (if one of the blocked ports becomes designated) to converge.

To summarize, convergence time will be message age time<T<message age time+2*forward delay time Keeping the current defaults, this translates to 20–50 seconds (assuming no propagation and processing delays).

The above relationship is true even when a designated port fails on a bridge and there is at least one neighbor on the connected segment with the root port. Failure of a blocked port doesn't affect the spanning tree.

Convergence of a bridged network in situations involving changing of spanning tree topology can therefore cause significant loss of service situations, particularly in networks that carry real time data. For example, the use of data networks and the Internet for audio and video transmissions of real time signals is increasing. Twenty to fifty second convergence times for these uses of the data network can cause unacceptable glitches. Accordingly, it is desirable to provide a technique to improve the availability of a bridged network in the face of changes in topology.

SUMMARY OF THE INVENTION

According to the present invention, physical connectivity of a bridged network operating according to the spanning tree can be restored within as little as ten milliseconds (or less) following a physical link failure, or other event signaling the change of a root port on a bridge. According to the present invention, an alternate port in the blocking state that becomes the new root port after detection of failure of the root port before the change in topology can forward frames immediately, providing that the prior root port becomes blocking. Thus new port state transition rules are provided which cover the case of physical link loss of the root port allowing immediate fail over to another link on the bridge to the network, improving the connectivity of the bridged network in the event of root port failure.

The benefit of this high availability tree is dramatic when point-to-point links with a "loss of light" or "link beat absent" detection capability interconnect to bridges. Physical failures can be detected, and connectivity re-established within as little as 10 milliseconds or less. The present invention also applies to non-point-to-point links, in which bridges are interconnected by a shared media.

Thus, the present invention can be characterized as an improvement to the spanning tree protocol which provides for identifying a port on the bridge in the alternate port role which qualifies as a next best root port. Upon detection of a failure at the root port, or other event causing a change in the root port to a blocking state, the next best root port transitions to the root port role and forwarding state immediately without traversing the listening and learning states of the standard protocol and without requiring satisfaction of the conditions of such transitional states. Also, in networks in which there is a possibility of shared media links between bridges, ports that have the alternate port role, and connect to a LAN which is also connected through a designated port on the same bridge are identified as a backup port. The algorithm prevents such backup ports from transitioning to the forwarding state before the designated port connected to the same LAN segment transitions to a blocking state.

Network intermediate devices for a network, comprising a plurality of local area network segments, according to the present invention comprise a plurality of ports coupled to LAN segments in the network and topology management resources which manage the plurality of ports according to a spanning tree algorithm, to set an active topology for the plurality of ports. The topology management resources include memory that store parameters specifying the active topology. The parameters include an identification of a root of the network, an identification of a port in the plurality of ports for a root port role to be used for a path to the root, identification of one or more ports in the plurality of ports for designated port roles to be used for paths between the root and respective LAN segments coupled to the one or more ports, and identification of one or more ports in the plurality of ports for alternate port roles (for example, by not being root or designated). Logic in the topology management resources computes states for the ports in the plurality of ports in response to the parameters. This logic places the port in the root port role in a forwarding state, places the one or more ports in the designated port roles in a forwarding state, and places the one or more ports in the alternate port roles in a blocking state. In addition, logic is provided to manage transition of the states of the ports in the plurality of ports in response to a change in the active topology. For a port changing from the alternate port role to a designated port role, the logic causes a transition from the blocking state to a transitional state, such as a state involving the listening and learning processes of the 802.1D standard, and then upon satisfaction of a condition of the transitional state to the forwarding state. For a particular port changing from the alternate port role to the root port role, the logic managing the transition causes transition from the blocking state to the forwarding state without requiring satisfaction of the condition of the transitional state.

According to one example, the logic that manages transitional states includes a timer measuring elapsed time, for example the forward delay timer of the 802.1D standard, from an event signaling the changing active topology. The condition of the transitional state comprises the elapsed time reaching a threshold. Alternatively, the condition of the transitional state which much be satisfied before transition to the forwarding state comprises expiry of an interval selected to ensure that there are no frames in the network forwarded by devices in the network according to the active topology before the change.

According to another aspect of the invention, the logic that manages transition of states includes logic for a transition from an alternate port role to a designated port role in the case in which the root port after the change had a forwarding state before the change. In this case, transition from the blocking state to the forwarding state occurs without requiring satisfaction of the conditions of the transitional state.

Further according to one aspect of the invention, the parameters in the memory of the topology management resources include information to identify one or more ports having the alternate port role as a next root. The logic which manages transition from the blocking state to a forwarding state for the particular port changing from the alternate port role to the root port role, causes transition from the blocking state to the forwarding state without traversing the transitional state, if the particular port is identified as the next root prior to the change.

According to a further aspect of the invention, where a given port in the plurality of ports which has the designated port role is coupled to a particular LAN segment, the parameters include information to identify a port in the alternate port role and coupled to that particular LAN segment, as a "backup" port. The logic to manage transition from a blocking state to a forwarding state for a port in the backup role changing from the alternate port role to the root port role requires satisfaction of a transitional condition if the port is identified as the backup port prior to the change. This transitional condition prevents both the given port having the designated port role and the particular port changing from the backup port to the root port, from having the forwarding state at the same time during the change.

According to another aspect of the invention, the logic which manages transitions of states additional includes logic for a particular port changing from one of a root port role and a designated port role to an alternate port role. For this transition, the logic causes a transition from the forwarding state to a temporary state, referred to as a "forgetting" state, in which the particular port blocks transmissions of frames, and upon satisfaction of a first condition to the blocking state, or upon satisfaction of a second condition back to the forwarding state. The first condition comprises expiry of a time interval after the change within which there is a possibility of spanning tree information being received which would require the port to return to the forwarding state. The second condition comprises receiving information within the time interval causing the particular port to stay in the forwarding state after the change.

Accordingly, the present invention provides for enhancements to the spanning tree protocol based on identifying port roles including the root port role, the designated port role, an alternate port role, and in shared media networks a backup port role. Transitions from the blocking to the forwarding state, and from the forwarding to the blocking states depend upon the particular role of the port.

The present invention provides for configuring switched LANs which sustain no more than 50 milliseconds service availability interruption after failure of a switch or a physical link. Also, the present invention allows for migration smoothly from a legacy networks based on the prior art spanning tree protocol to a highly available network without significant additional administrative overhead. Thus, the spanning tree root port can be moved, and start forwarding frames immediately if the previous root port no longer forwards frames, such as in the case of a physical link failure. The improvement of the present invention allows a resilient link to be setup before failure of the root port as the next best port to the root. The improvement is fully compatible with existing standard switches.

Other aspects and advantages of the present invention can be seen upon review of the figures, the detailed description, and the claims which follow.

BRIEF DESCRIPTION OF THE FIGURES

FIGS. 3A–3B illustrate the prior art spanning tree standard port roles, states and transitions.

FIGS. 4A–4B illustrate the enhanced spanning tree port roles, states and transitions for point-to-point networks according to the present invention.

FIGS. 8A–8D illustrate a failure and recovery scenario for failure of the root bridge.

FIGS. 12A–12C illustrate the enhanced spanning tree port roles, states and transitions for networks having shared media connections according to the present invention.

FIGS. 14A–14D illustrate the enhanced spanning tree port roles, states and transitions for networking having shared media connections including the "forgetting" state.

In the tables of FIGS. 3A–3B, 4A–4B, 12A–12C and 14A–14D, X means event can't happen;—means no action is taken, i.e. no state changes or timer changes. The "footnotes" in the figures, follow:

[a]Start the forward delay timer;

[b]Restart the forward delay timer;

[c]Do not restart the forward delay timer (let it continue running);

[d]Stop the forward delay timer;

[e]Start the forgetting timer;

[f]Stop the forgetting timer;

[g]In the Disabled state this is 'become enabled';

[9]Covers the transition described as 'become backup' below as Backup is not distinguished from Alternate in the standard;

[10]This event caused if the new Root Port was not previously Forwarding, i.e. was Blocking, Listening, or Learning. Event covers "enable port" for disabled ports;

[11]This event if the new Root Port was previously Forwarding. Event covers "enable port" for disabled ports;

[12]Covers the transition described as 'become backup' below as Backup is not distinguished from Alternate in the standard;

[13]This event caused if the new Root Port was not previously Forwarding, i.e. was $Blocking_b$, $Listening_r$, Listening, or Learning. Event covers "enable port" for disabled ports;

[14]This event if the new Root Port was previously Forwarding. Event covers "enable port" for disabled ports;

[15]The "Forgetting" state has been added, here named $Blocking_f$;

[16]This event caused if the new Root Port was not previously Forwarding or $Blocking_f$, i.e. was $Blocking_b$, $Listening_r$, Listening, or Learning. Event covers "enable port" for disabled ports;

[17]This event if the new Root Port was previously Forwarding or $Blocking_f$. Event covers "enable port" for disabled ports.

DETAILED DESCRIPTION

Figure 1:
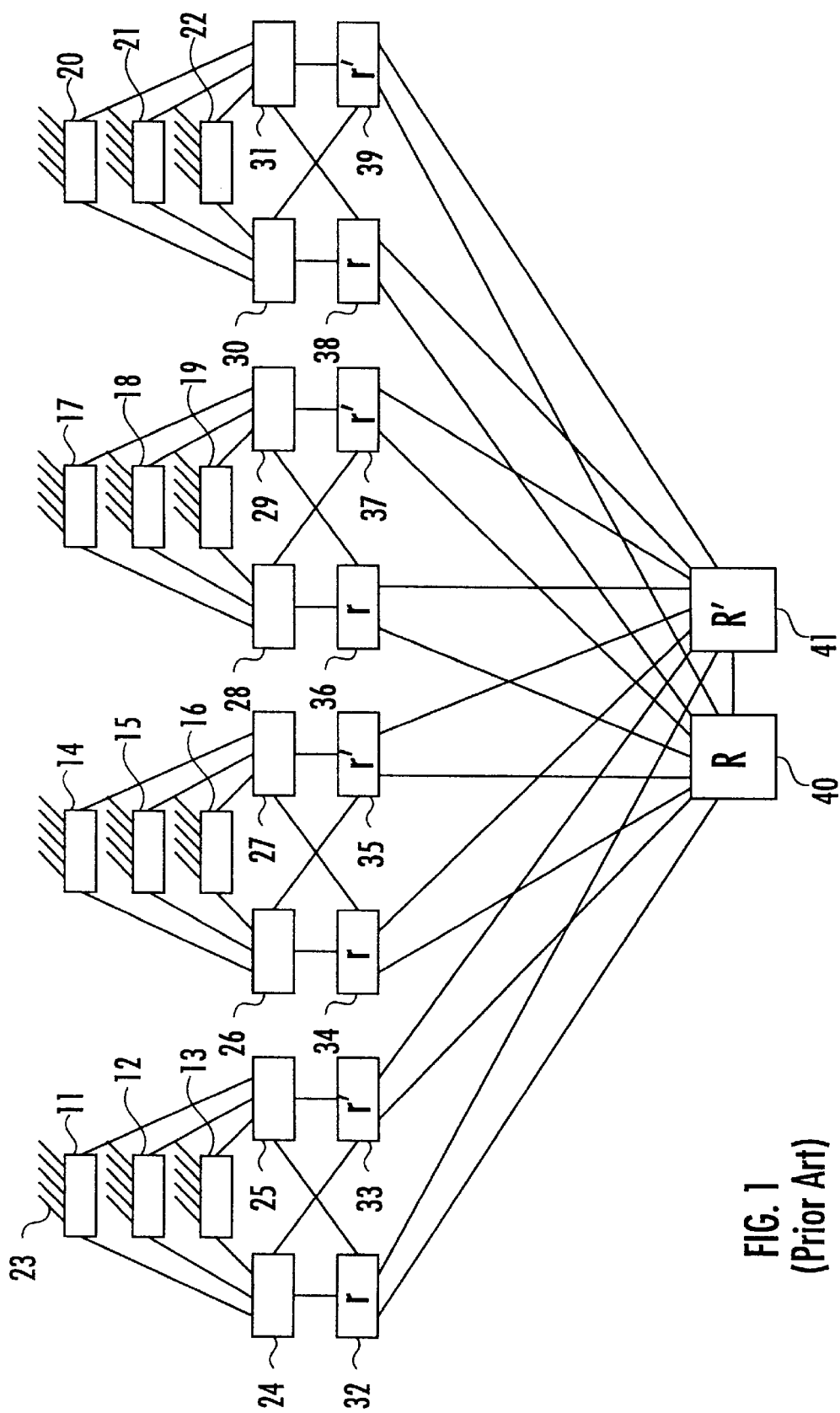
FIG. 1 is a block diagram of a fault tolerant switched network arrangement which might be encountered in the prior art.

A detailed description of the present invention is provided with respect to the figures, in which FIG. 1 provides perspective for a prior art, fault tolerant switched networks in which the high availability spanning tree protocol of the present invention may be applied to improve service availability in the event of failure of a switch or physical link.

Thus, FIG. 1 illustrates a plurality of first tier bridges 11–22. The first tier bridges include connections to end stations represented by the symbol 23 on bridge 11 and similar symbols on each of the other first tier bridges. The first tier bridges 11–22 have point-to-point links across 802.x LAN segments to more than one second tier bridges.

Thus, bridges 11–13 are coupled to bridges 24 and 25. Bridges 14–16 are coupled to bridges 26 and 27. Bridges 17–19 are coupled to bridges 28 and 29. Bridges 20–22 are coupled to bridges 30 and 31. The second tier bridges 24–31 are likewise each coupled to two third tier network devices that include the bridging protocol. In this embodiment, the network devices coupled to the second tier bridges comprise routers which preferably provide the primary and backup router functionality of the virtual router redundancy protocol VRRP, in addition to providing the bridge functionality. Thus, the second tier bridges 24 and 25 are coupled to the third tier devices 32 and 33. The second tier bridges 26 and 27 are coupled to the third tier devices 34 and 35. Bridges 28 and 29 in the second tier are coupled to the third tier devices 36 and 37. Bridges 30 and 31 in the second tier are coupled to the third tier devices 38 and 39. Finally, for the configuration of FIG. 1, each of the third tier devices is coupled to two fourth tier devices. Thus, each of the devices 32–39 is coupled by point-to-point links to router 40 and to router 41. The routers 40 and 41 provide the bridge functionality and support the spanning tree, as well as acting as primary and backup routers of the VRRP protocol, or other router redundancy protocols.

As can be seen, the fault tolerant switched network shown in FIG. 1 provides for maintaining connectivity in the event of any single point of failure amongst all of the end stations in the network. However, according to the spanning tree protocol in the event of a failure of a root node, or other topology change affecting the root port, the spanning tree protocol convergence time can be from 20 to 50 seconds, causing temporary loss availability. According to the present invention, the spanning tree protocol maintains high availability in fault tolerant switched networks such as shown in FIG. 1 with a system that sustains no more than 10 to 50 milliseconds, or less depending on the speed of the link failure detection circuits and other hardware constraints, service availability interruption after a switch or physical link failure.

Figure 2:
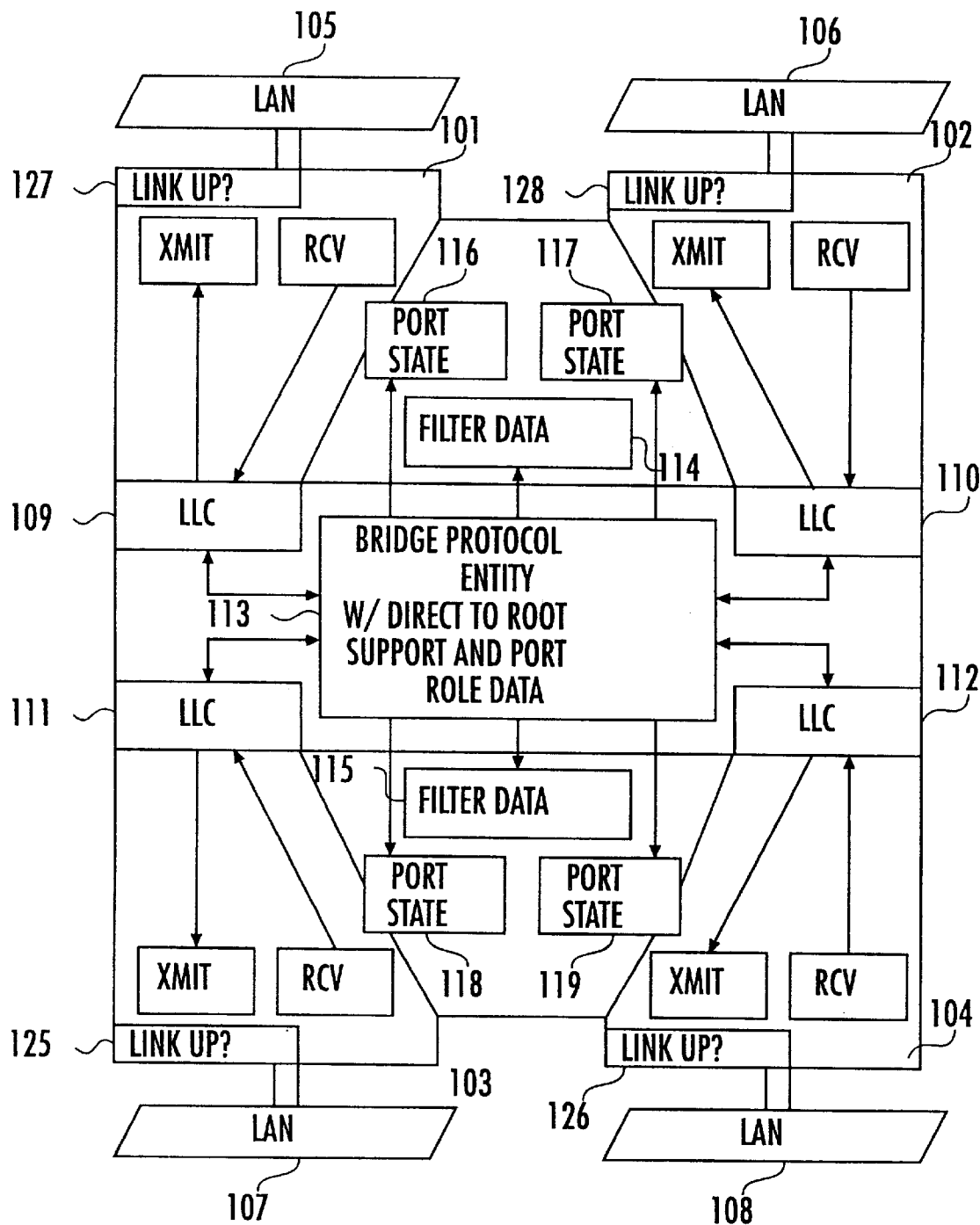
FIG. 2 is a block diagram of a bridge implementing the direct to root support and port role data storage according to the present invention.

FIG. 2 provides a block diagram of the bridge functionality in the spanning tree entities, for example to be used in the devices of FIG. 1 enhanced according to the present invention. FIG. 2 is drawn in the style adapted in the IEEE 802.1D standard of FIGS. 3–6, and is enhanced to provide four ports.

Thus, the bridge illustrated in FIG. 2 includes ports 101, 102, 103, and 104. Each of the ports 101–104 is coupled to a respective LAN segment 105–108. The ports support MAC layer transmit and receive functionality. Logical link control layer LLC entities 109–112 provide for connection to bridge protocol entity 113 according to the present invention. The bridge protocol entity provides memory for storing parameters that identify port roles, and for managing transition of port state information for the plurality of ports. Furthermore, the bridge protocol entity maintains filter data 114, 115, for frames being transmitted amongst the ports, and port state information 116, 117, 118, and 119 for the respective ports.

Linkup monitors 125–128 are included for each port, which signal loss-of-light or loss of link beat situations to the protocol entity, which can trigger topology changes according to the present invention very quickly.

FIG. 3A illustrates the standard port roles according to the prior art spanning tree protocol, and states and transitions between states for the disabled, root, designated and alternate port roles. FIG. 3B illustrates the standard port states and transitions without reference to roles. These tables can be understood by reference to the 802.1D standard and are not further described herein. However, it is notable that the port states and transitions FIG. 3B do not depend on port role. All transitions from the blocking state go to the listening state regardless of port role.

FIG. 4A illustrates the enhanced transitions according to the present invention for point-to-point networks, including the transitions that depend on port role. It can be seen that for ports in the root port role, there are no listening or learning states. Listening or learning states are not required for a transition from the alternate port role to the root port role. FIG. 4B collapses the table in FIG. 4A to eliminate redundant states in the various roles.

Figure 5:
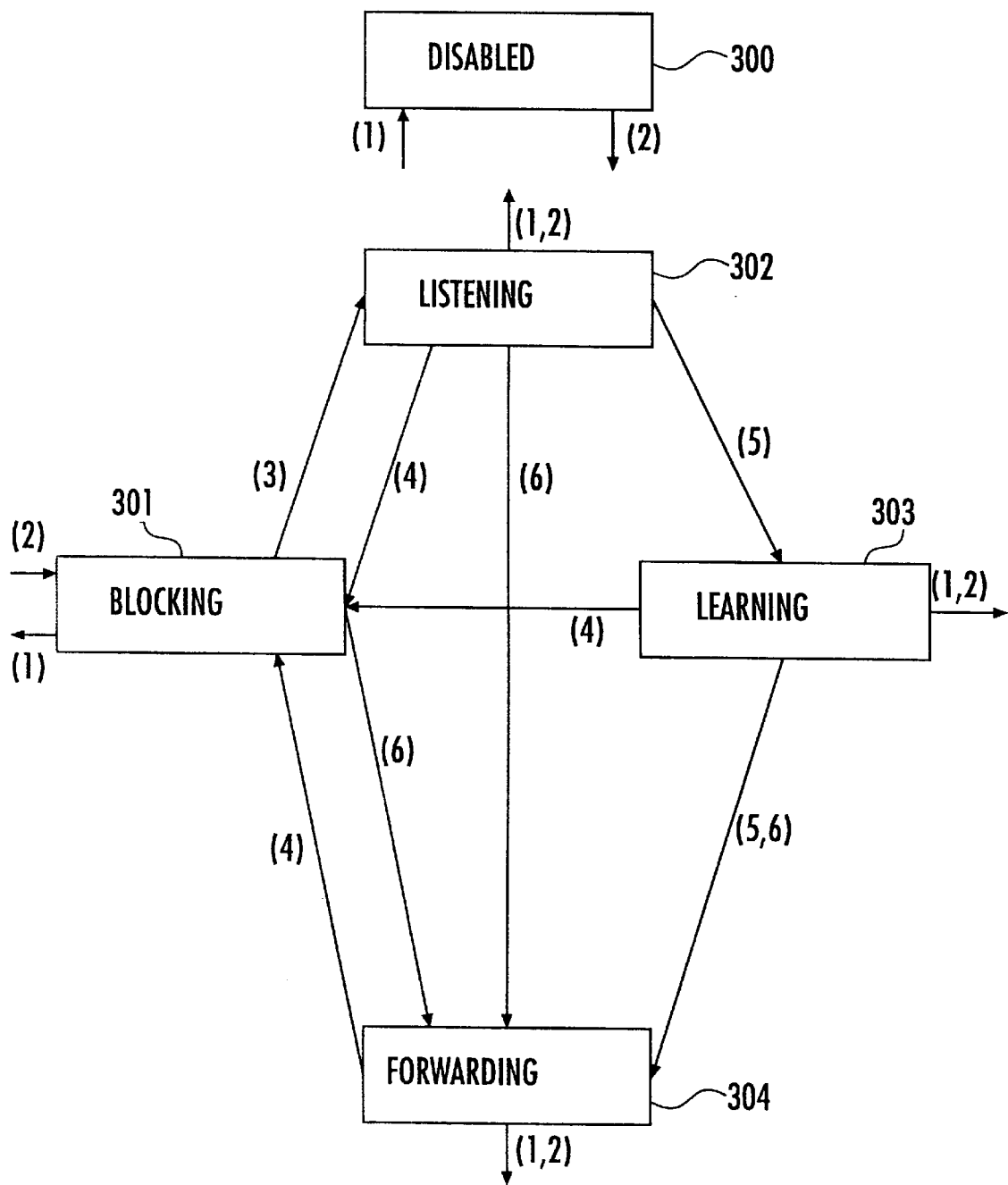
FIG. 5 is a port state diagram according to the present invention for bridged networks consisting of point-to-point LAN segments only.

FIG. 5 illustrates the state transitions represented in the FIG. 4B which occur according to the role to be assumed after the change, and the role before the change. Thus, in FIG. 5 the ports can assume a disabled state 300, a blocking state 301, a listening state 302, a learning state 303, and a forwarding state 304. These states behave just as defined in the specification for the 802.1D standard in the preferred embodiment. Transitions from the disabled state into an active state occur on transition (2) to the blocking state 301. Transitions out of the blocking state 301 into the disabled state 300 occur on transition (1). From the listening state 302, learning state 303 or forwarding state 304, any transition to become enabled (1) or become disabled (2), causes a transition into the disabled state 300. The disabled state 300 can be ignored for the purposes of the balance of the description of the present invention.

In FIG. 5, the transition (3) corresponds to a change in topology that requires the port to become a designated port, both in the condition that the new root port was not previously forwarding prior to the change, and in the condition that the new root port was previously forwarding prior to the change. This transition occurs from the blocking state on 301 to the listening state 302.

The transition (4) occurs when the port is to assume that alternate port role. In FIG. 5, this transition (4) occurs from any of the listening, learning or forwarding states 302–304 into the blocking state 301. The transition (5) occurs upon expiration of the forward delay timer. This transition occurs from the listening state 302 into the learning state 303, or from the learning state 303 into the forwarding state 304. The transition (6) occurs upon transition to the root port role from the alternate port role. The transition (6) occurs from the blocking, listening or learning states 301–303 into the forwarding state 304 without traversing any transitional states.

Thus it can be seen that for the protocol entity of FIG. 2 includes memory that stores parameter that specify the active topology. The parameters identify a root of the network, identify a port for a root port role to use for a path to the root, and identify one or more ports in the plurality of ports as designated port roles. Also, ports in the alternate port role are identified by parameters stored in the memory. For a port changing from the alternate port role to a designated port role, logic causes a transition from the blocking state to a transitional state, including the listening and learning states 302, 303, prior to transition into the forwarding state 304. For a port changing from the alternate port role to the root port role, the logic causes transition directly from the blocking state to the forwarding state without requiring satisfaction of the conditions of the transitional state.

For the case in which there are more than one alternate ports, the protocol entity stores information identifying a next root from among the ports in the alternate role. For example, the next root can be specified as the port in the alternate role having the lowest cost route to the root of the network.

Figure 6B:
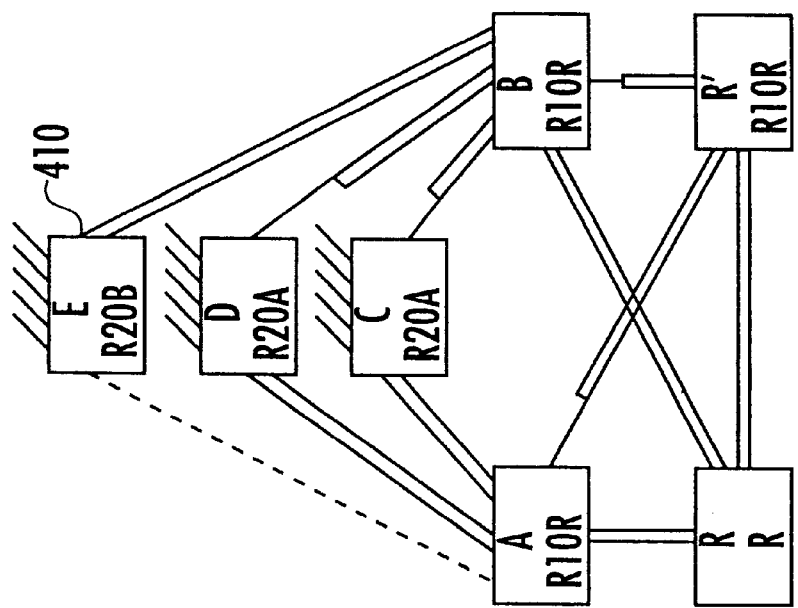
FIGS. 6A–6B illustrate a failure and recovery scenario for failure of the root port on bridge E.
Figure 6A:
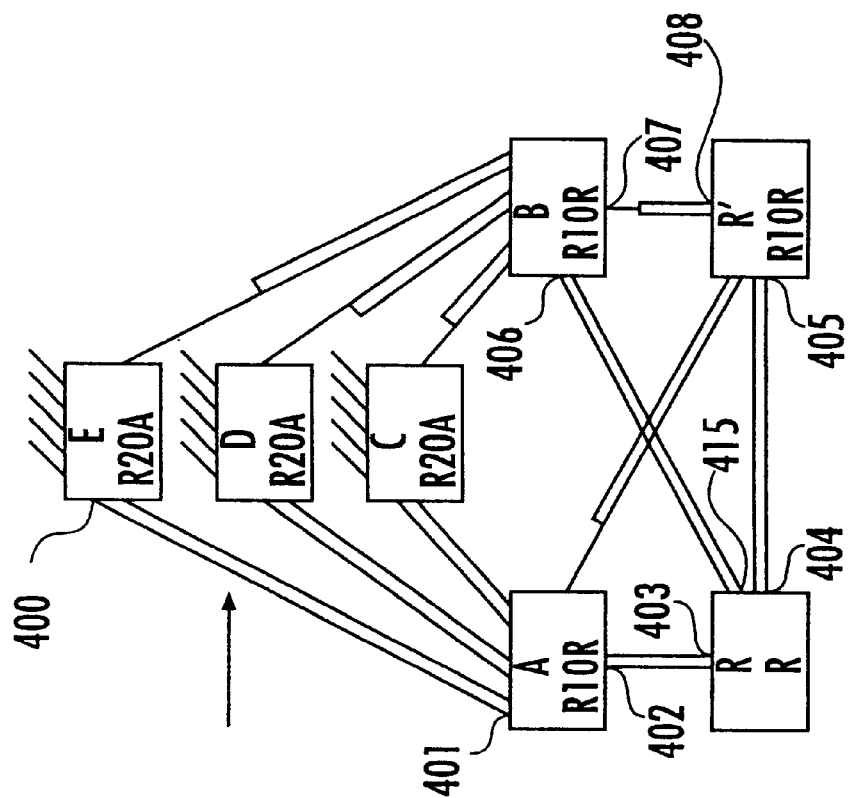

FIGS. 6A–6B, 7A–7C, 8A–8D, and 9A–9C illustrate various failure and recovery scenarios according to the state diagram of FIG. 5. In FIG. 6A, bridges A, B, C, D and E are illustrated which are coupled to bridges R and R'. The root port 400 on bridge E is coupled to a designated port 401 on bridge A. The root port 402 on bridge A is coupled to a designated port 403 on the root R. The designated port 404 on the root R is coupled to the root port 405 on router R'. Designated port 415 is coupled to the root port 406 on bridge B. Port 407 on bridge B has an alternate port role while port 408 on bridge R' has a designated port role. Thus, in review of the figures, the heavy line on the link at a port on a bridge corresponds to a forwarding state on the port, while a thinner line corresponds to a blocking state or alternate port role on the port.

In FIGS. 6A and 6B, the spanning tree parameters are provided in association with each bridge. Thus, bridge E includes within the block on the drawing the parameters R20A. This indicates that the protocol entity in the bridge identifies the bridge R as the root, the path cost of 20 between the root port 400 and the root R, and the next bridge between bridge E and the root as bridge A. Similar parameters are stored in bridges D and C where each is coupled through bridge A with a path cost of 20 to the root R. Bridge A is coupled to the root R with a path cost of 10 directly through to bridge R. Similarly, bridges B and R' store the same parameters—R10R.

In FIGS. 6A and 6B, the failure of the link between bridge E and bridge A occurs as indicated by the arrow in FIG. 6A. In FIG. 6B the failed link is represented by the dashed line. Immediately upon detection of the failure according to the present invention, port 410 on bridge E becomes the root port for bridge A and enters the forwarding state, and maintains connectivity to the root through bridge B (R20A to R20B).

After the reconfiguration of the topology shown in FIG. 6B, bridge E changes the information stored to indicate that the root remains R, and the path cost remains 20. However, the next bridge in the path is bridge B rather than bridge A (R20A to R20B). No other reconfiguration of the tree is necessary in the event of the failure of the link between bridge E and bridge A in this scenario.

Figure 7C:
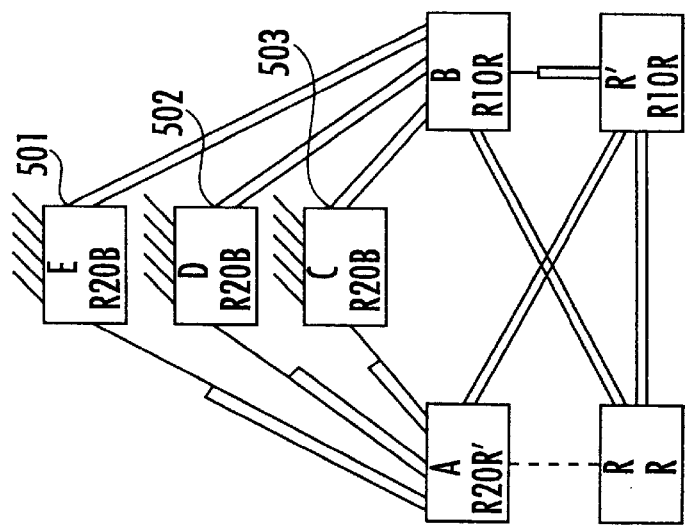
FIGS. 7A–7C illustrate a failure and recovery scenario for failure of the root port on bridge A.
Figure 7B:
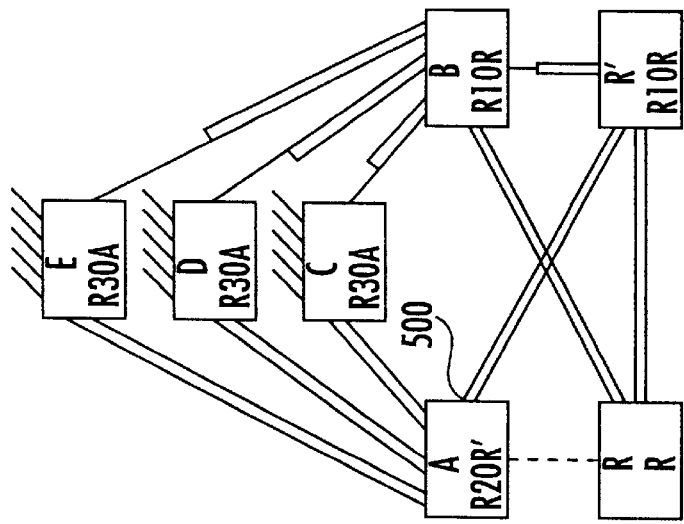
Figure 7A:
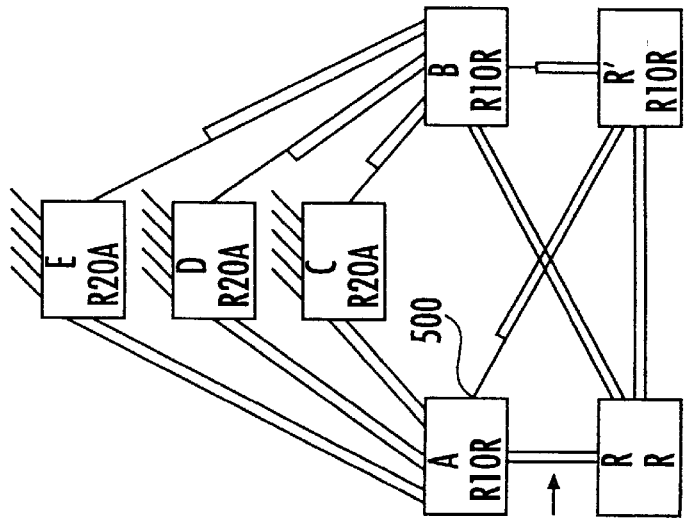

FIGS. 7A–7C, a failure of the link between bridge A and the root bridge R is illustrated. In this case, prior to the change as shown in FIG. 7A, the port 500 on bridge A is an alternate port for connection to bridge R'. After the detection of the failure as illustrated in FIG. 7B, port 500 becomes the root port for bridge A, maintaining connectivity of the network immediately after the change. However, the bridge parameters for the network also change so that bridge A has parameter R20R', bridges C, D and E now have the parameters R30A. As the topology information propagates through the network, the bridge eventually settles to the configuration of FIG. 7C in which bridges E, D and C change their root ports to ports 501, 502 and 503 respectively through the bridge B. In this way, the path cost from bridges C, D and E remains 20 after the settling of the topology. However, during the transition connectivity of the network is maintained.

FIGS. 8A–8C illustrate a failure and recovery scenario upon failure of the root bridge R. Thus, root bridge R is identified by the arrow of FIG. 8A. Upon failure, the root ports 600, 601 and 602 of bridges A, B and R' fail simultaneously. The bridges A and B instantly change their root ports to ports 603 and 604 respectively, as shown in FIG. 8B. As shown in FIG. 8C, bridges A and B recognize bridge R' as the new root bridge and the path cost for connections to the root bridge R' are updated throughout the network.

Figure 9C:
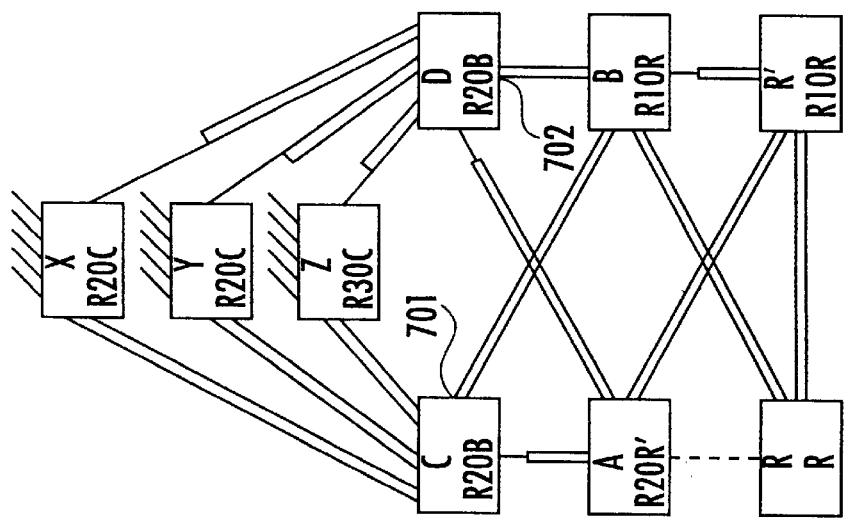
FIGS. 9A–9C illustrate a failure and recovery scenario for failure of the root port on bridge A.
Figure 9B:
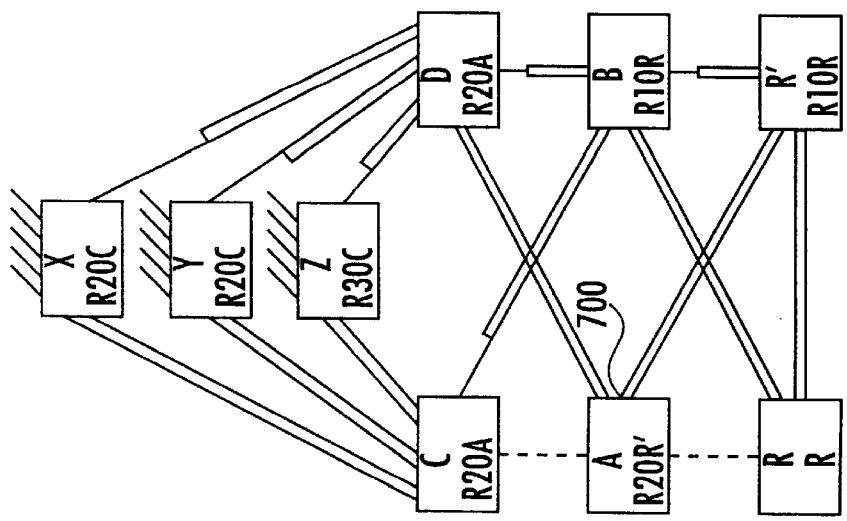
Figure 9A:
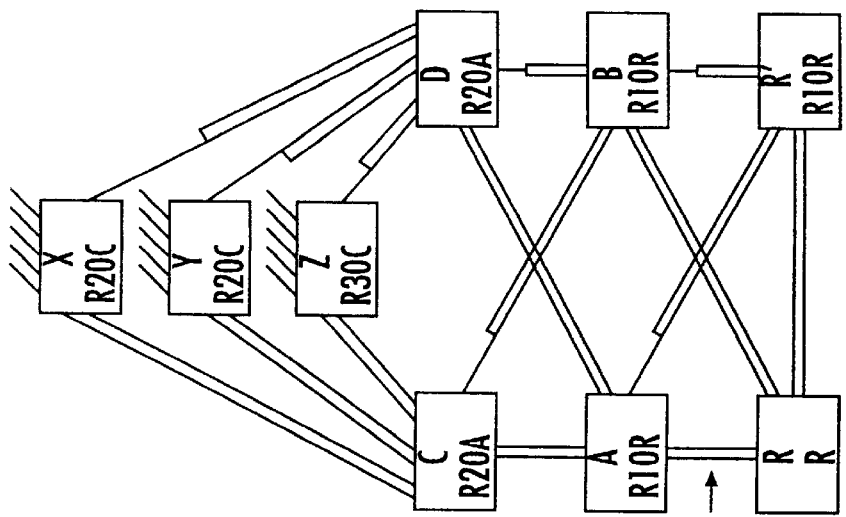

FIGS. 9A–9C illustrate a failure and recovery scenario for a more complex bridged network, for failure of the link identified by the arrow in FIG. 9A between the root R and bridge A. As shown in FIG. 9B immediately after the failure, bridge A switches its root port to port 700 which previously had an alternate port role. It identifies the next path toward the root from bridge A as bridge R' and increases its path cost from 10 to 20. As shown in FIG. 9C, the path cost parameters propagate up the network, causing bridge C to switch its root port to port 701, and bridge D to change its root port to port 702. Bridges X, Y and Z are not effected by this change in the topology.

The instantaneous switching of ports having the alternate port role to the root port role maintains connectivity in the high availability tree of the present invention for a wide variety of resilient network architectures as shown in the previous examples for point-to-point links between the bridges. The present invention also works for systems in which there may be shared media links between bridges. In this case, it is necessary to identify backup ports which are ports that couple to a LAN segment which is also connected to the same bridge through another port having a designated port role. Because alternate ports in the backup role may be switched to the root in a reconfiguration of the topology, it is important to ensure that no loops in the network are created by having both a port previously in a backup role and a port in the designated role become forwarding at the same time. Thus, it is necessary to ensure that prior to any transition from a blocking to forwarding state, any backup port goes through a transitional state prior to switching to the forwarding state to prevent this loop from occurring.

Figure 10B:
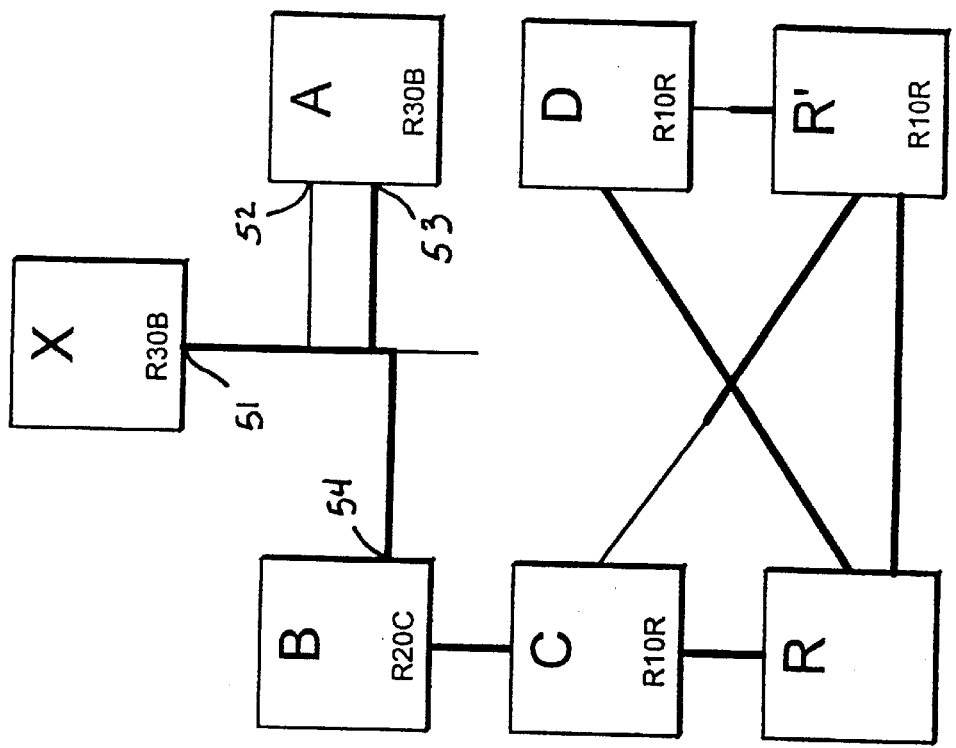
FIGS. 10A–10B illustrate a failure and recovery scenario for a shared media network.
Figure 10A:
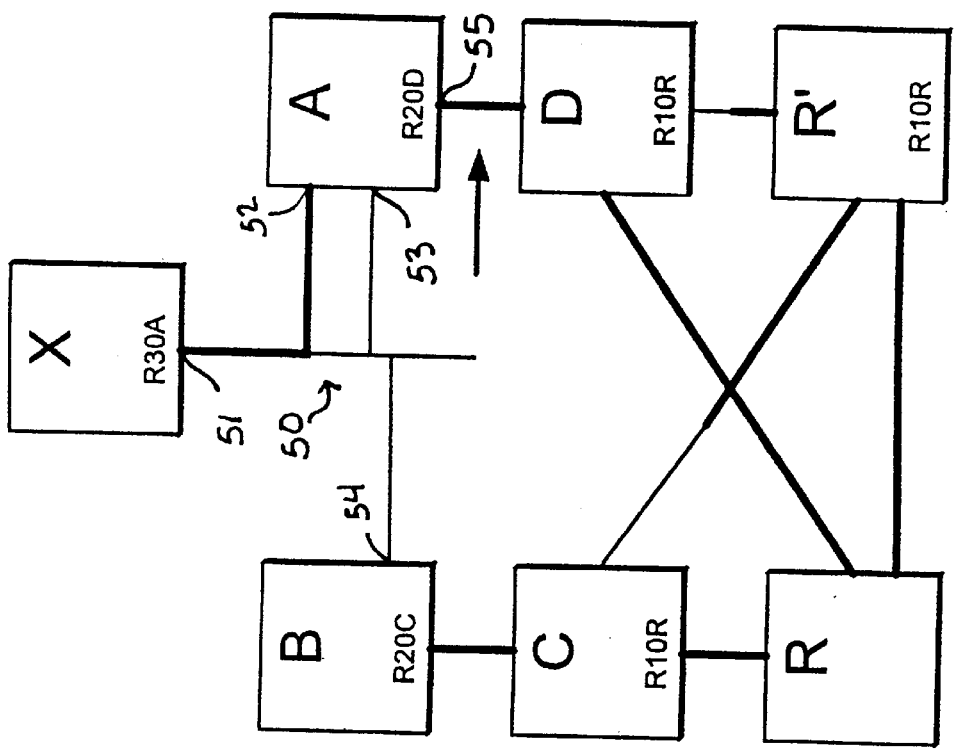

FIGS. 10A and 10B illustrate a failure and recovery scenario involving a backup port role on a shared media LAN according to the present invention. In FIG. 10A, the topology prior to the failure is illustrated in which bridge X, bridge A and bridge B are all coupled to a shared media LAN 50, such as an Ethernet segment connect via a repeater to multiple devices. Port 51 on bridge X is the root port. Port 52 on bridge A is a designated port for LAN segment 50. Port 53 on bridge A is a backup port for bridge A in the alternate port role. Thus, port 53 is in a blocking state but couples to the same LAN segment 50 as does the designated port 52, and therefore acts as a backup port. (If the port 52 was in the blocking state, then port 53 would not be a "backup port" for this purpose.) Bridge B is also coupled to LAN 50 at port 54. Port 54 is in an alternate port role in the initial topology. The spanning tree parameters are shown in the respective bridge blocks as discussed above with respect to the preceding failure and recovery figures.

In FIG. 10A, a failure of the root port 55 on bridge A is about to occur. FIG. 10B illustrates the topology after the failure. In this case, the backup port 53 may be designated as the new root port. However, it is possible that the old designated port 52 remains in the forwarding state for a time interval after the decision to switch port 53 to the root port is made. As can be seen, after the transition, port 54 becomes a designated port for bridge B to accommodate the root port 51 of bridge X. Port 53 will become the root port of bridge A. No other changes to the topology occur.

Figure 11:
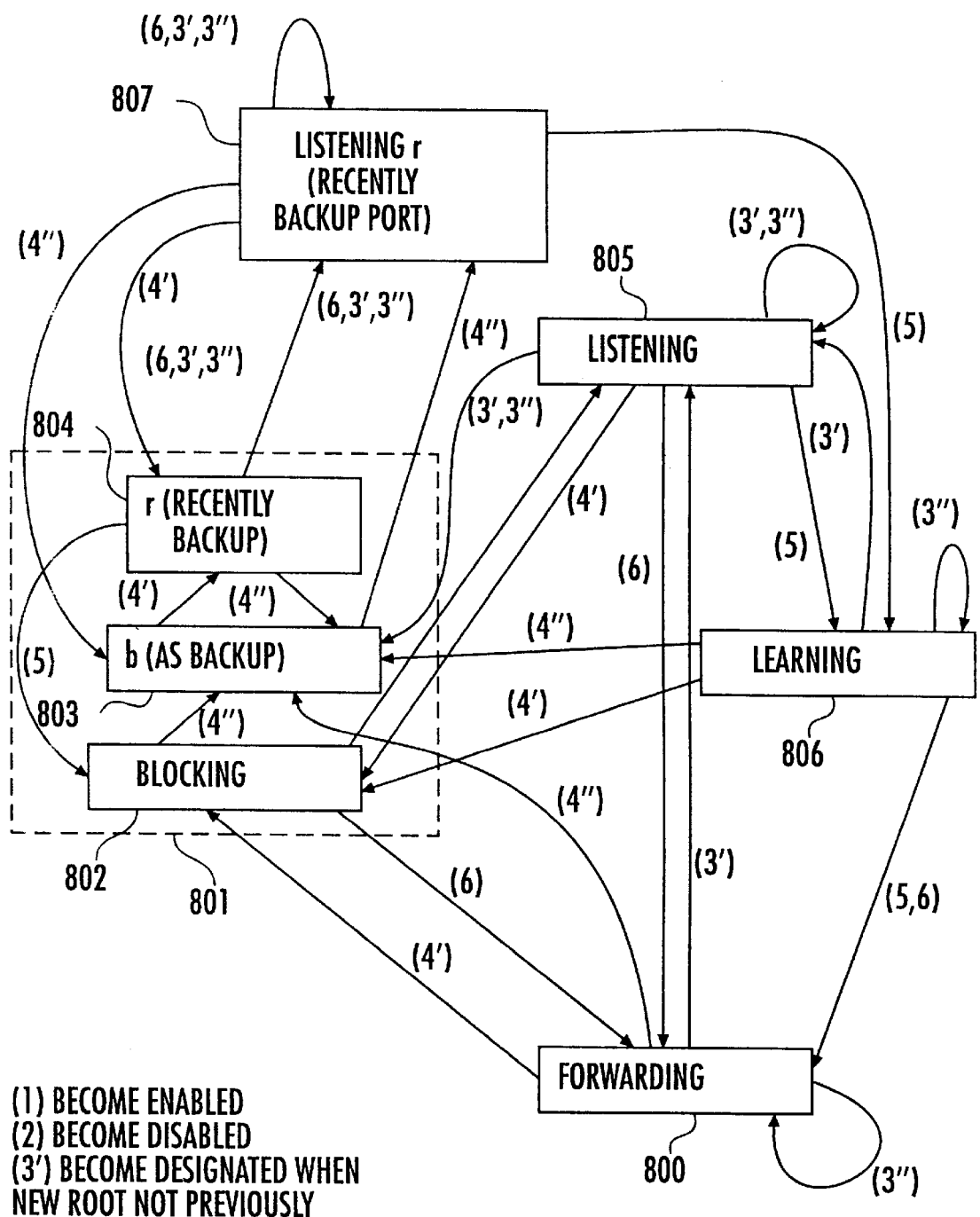
FIG. 11 illustrates an enhanced port state diagram according to the present invention supporting shared media links between bridges.

Thus, it is important that the port state machine is adapted to accommodate this potential loop situation. The state diagram of FIG. 11 illustrates enhancements to the state diagram of FIG. 5 necessary to ensure this functionality. These transitions are illustrated in FIGS. 12A and 12B, which include the port roles, and 12C which are addressed to state transitions only. The disabled state is not shown in the figure. Thus, transitions (1) and (2) from FIG. 5 have been deleted. The remaining transitions include transition (3'), in which a port is assuming a designated port role when the new root port was not in the forwarding state prior to the change. Transition (3") occurs when a port is assuming a designated port role if the new root port was previously in the forwarding state. Transition (4') corresponds to a transition to the alternate port role. Transition (4") corresponds to a transition to the alternate port role which is also a backup port. Transition (5) corresponds to expiration of the forward delay timer. Transition (6) corresponds to a port assuming the root port role.

Thus, according to this port state diagram of FIG. 11, the port may enter a forwarding state 800 or a blocking state 801, which can be one of three substates. The three substates of the blocking state 801 include standard blocking state 802, the blocking state for a port in the backup role 803, and the blocking state for a port which was in the backup role recently 804. By recently in this context, it was meant that the port was in a backup role within a time interval long enough to ensure that no loops are formed with a port in the designated port role for which the current port was a backup recently when the port transitions to the forwarding state (assumes the root port role). In the embodiment illustrated in FIG. 11, this time interval is equal to the length of the forward delay timer, and thus the transition from the recently backup state 804 to the standard blocking state 802 occurs upon such timer expiry—transition (5).

The state diagram also includes a standard listening state 805 and a learning state 806. To ensure that any port recently in the backup role does not assume a forwarding state at the same time as its prior designated port remains forwarding, an additional listening state 807 is included for ports recently in the backup role.

In an alternate embodiment, the logic managing transitions prevents the backup port from changing to the root port role, and allows the port in the designated port role to transition eventually under the protocol to the root port role, if appropriate. This also prevents both ports form assuming a forwarding state at the same time.

In an alternative, the port in the backup role can be disabled from selection as the next root. In this case, the port in the designated role may become the root port.

FIGS. 12A to 12C illustrate the functionality of FIG. 11. In FIGS. 12A–12B, the role of the port subject of the transitions is emphasized. In FIG. 12C, the port states are condensed so that any overlapping state between various roles are eliminated. Thus, FIG. 12C corresponds more closely to the state diagram of FIG. 11. In the table of FIG. 12C, the blocking state 801 is represented by a blocking$_r$ which corresponds to the state 804 in FIG. 8, a blocking$_b$ which corresponds to state 803 in FIG. 8, and a standard blocking which corresponds to the blocking state 802 in FIG. 8. Also, the listening state includes a listening$_r$ which corresponds to the state 807 in FIG. 8.

As can be seen with reference to FIGS. 12A–12B, a root port can adopt a listening$_r$ state 807, a learning state 806, and a forwarding state. A designated port may assume a listening$_r$ state 807, a listening state 805, a learning state 806, and a forwarding state 800. An alternate port may assume a blocking$_r$ state 804 or a blocking state 802. A backup port may assume only a blocking$_b$ 803.

For the transitions, reference to FIG. 12C is made. A first event, other than the become disabled event, is an event which causes the current port to become the root port. This occurs for example when the root port before the change fails and the current port has the next best root role according to the spanning tree algorithm. This effects ports in the listening state, the learning state, the blocking$_r$ state, the blocking state and the blocking$_b$ states. In FIG. 11, the transition is labeled (6). From the blocking state 802, the listening state 805, and the learning state 806, a transition (6) is made directly to the forwarding state 800. However, from the backup state 803, or the recently backup state 805, the transition (6) cannot go directly to forwarding because of the possibility of loops with the corresponding designated port. Thus, a transition (6) for a become root event occurs from states 802 and 804 to the listening$_r$ state 807. In both of these transitions, the forward delay timer is reset. Upon expiry of the forward delay timer, as represented by the transition (5) from the listening$_r$ state 807, the port transitions to the learning state 806.

In the event that the port is to become the designated port, and the new root port was not previously in the forwarding state before the change, then the transition (3') is executed. Similarly, if the port is to become a designated port but the root port was previously in the forwarding state, then the transition (3") is executed. The become designated transitions (3') and (3") all involve transitions to the listening state 805 or to the listening$_r$ state 807, with one exception. That is, the transition (3") from the forwarding state of a root port role to a designated port role forwarding state results in the port staying in the forwarding state.

The event become alternate is labeled by the (4') in the figure. The transition (4') become alternate causes the port to move to the blocking state 802. Thus, from the listening state 805, learning state 806, and forwarding state 800, become alternate role transition results in a switch directly to the blocking state 802. However, from the backup state 803, a become alternate transition (4') occurs to the recently backup state 805. Also, from the listening$_r$ state 807, a become alternate transition (4') results in a transition to the recently backup state 805. The delay timer is started when the port transitions from the backup state to the recently backup state 805, or to the listening state 807. From the recently backup state 805, the timer is not reset on this transition (4').

For the change to a backup role, the transition (4") is executed. In each case, the transition goes directly to the backup state 803. And the forward delay timer is stopped.

Some transitions (5) occur on expiry of the forward delay timer. A port in the state 804 transitions to the blocking state upon expiry of the forward delay timer. Ports in the listening state 805 or in the recently backup listening state 807 transition to the learning state 806 on expiry of the timer. Also ports in learning state 806 transition to the forwarding state upon expiry of the timer. The timer utilized for transitioning from the recently backup state may be chosen to be a different value or a different timer than the forward delay timer as suits a particular implementation. However, for convenience the same value may be utilized, as done in this embodiment.

Figure 13:
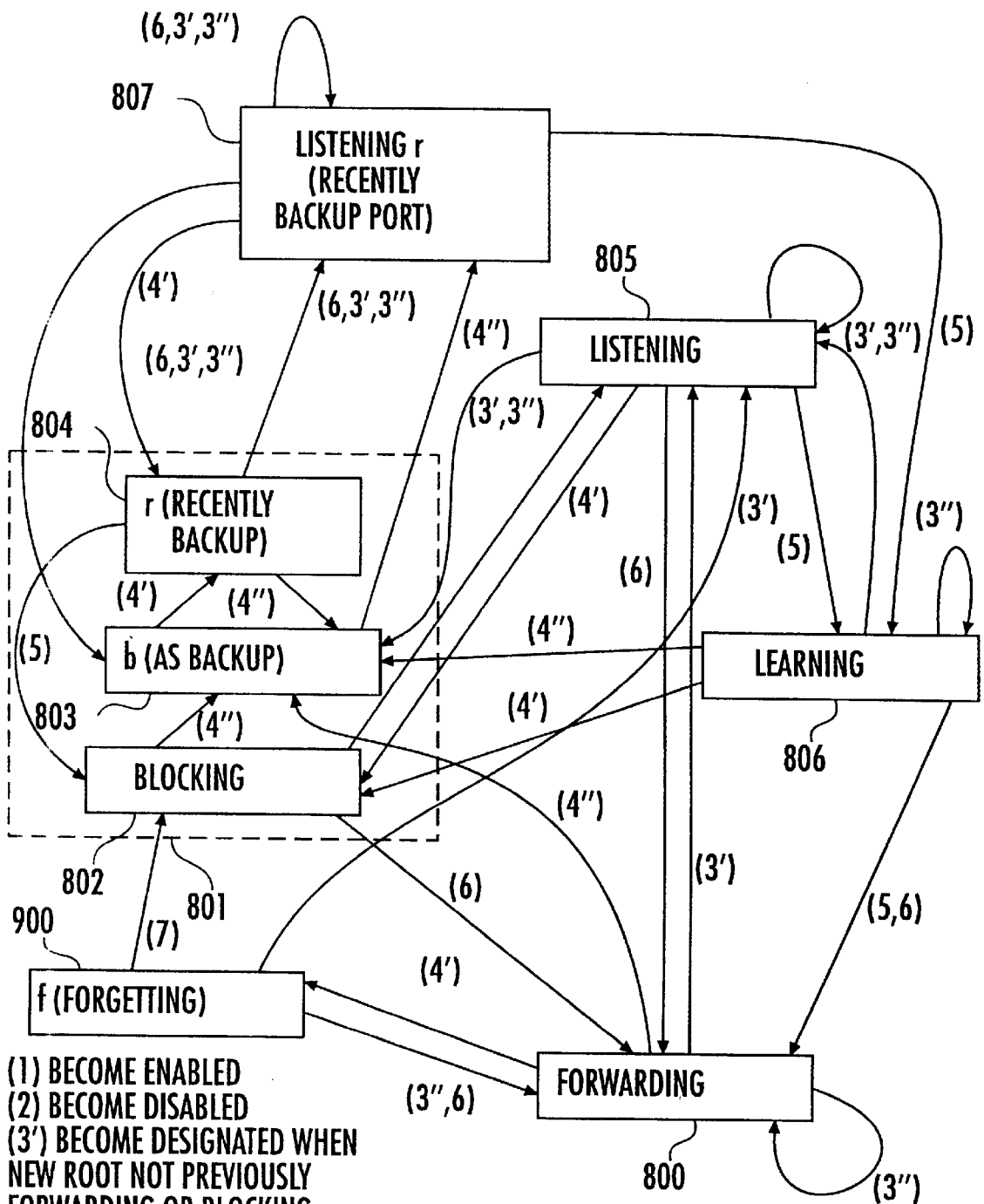
FIG. 13 illustrates an enhanced port state diagram according to the present invention for bridges supporting shared media links and including the "forgetting" temporary state between the forwarding and blocking states.

FIG. 13 illustrates a further enhancement of the spanning tree protocol according to the present invention. In particular, the temporary "forgetting" state 900 is added to the port state diagram. This state is described in detail in prior filed U.S. Pat. No. 5,790,808 entitled ACTIVE TOPOLOGY MAINTENANCE AND RECONFIGURING BRIDGED LOCAL AREA NETWORKS, invented by Michael J. Seaman.

FIGS. 14A–14D illustrate the enhanced port role and port state transitions including the temporary forgetting state 900. In the forgetting state, the port blocks transmission of frames as if it were in a blocking state.

In FIG. 13, the reference numbers of FIG. 11 are utilized where appropriate. The difference is described here.

The change for FIG. 13 relative to FIG. 11 occurs in the transition from the forwarding state 800 to the blocking state 802. Although the principle of the temporary forgetting state may be applied in other circumstances, no other transitions are effected according to this example implementation. In particular, for a port changing from the forwarding state 800, either as a designated port or as a root port, to the alternate port role, as labeled by transition (4'), the transition of FIG. 13 goes to the temporary forgetting state 900 rather than directly to the blocking state 802. In the forgetting state 900, a forgetting timer is initiated to measure a forgetting interval. If once the forgetting timer expires as represented by transition (7), the port transitions into the standard blocking state 802. However, if prior to expiration of the forgetting timer information becomes available requiring the port to assume a root port role, or to assume a designated port role when the root port prior to the change was already forwarding, then the state of the port returns immediately to the forwarding state 800 as represented by the transition labeled (3", 6). If the new information received prior to expiration of the forgetting timer requires the port to assume a designated port role, but the root port prior to the change was not in the forwarding state, then the port must assume the listening state 805 as indicated by the transition (3') in the figure. Also, if the new information suggests that the port should assume a backup role, then the port transitions (4") to the backup state 803. The temporary forgetting state 900 allows for maintaining the active topology for the port in the event of a transient information that would cause a switch to an alternate port role.

In summary, the present invention changes the spanning tree algorithm. A point-to-point link (between bridges) in a spanning tree has an attractive (and trivial) property that if the link is active (not blocked at one end), one end of the link will be a designated port and the other end will be a root port. To keep the old spanning tree external behavior while speeding up the convergence in fact of any topology change, the following concepts are introduced.

The invention specifies the necessary changes to the transition of port states between the forwarding and blocking states as the spanning tree protocol changes the roles of the ports between the root port, designated port, alternate port, and backup port according to the present invention. The implementation of the present invention currently contemplated does not affect the standard protocol other than improving the state transitions within the bridge. Thus, in a preferred system an external observer would not tell the difference by observing the bridge protocol data units which are transmitted according to the spanning tree. Furthermore, it is not necessary for all bridges in the network to adopt the improved spanning tree algorithm of the present invention for implementation.

The spanning tree improvement described herein provides rapid restoration of physical connectivity.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. For a network comprising a plurality of local area network LAN segments, a network device comprising:
   a plurality of ports coupled to LAN segments in the network;
   topology management resources which manage the plurality of ports according to a spanning tree algorithm, to set an active topology for the plurality of ports, including
      memory storing parameters for specifying the active topology, the parameters including information for an identification of a root of the network, identification of a port in the plurality of ports for a root port role to be used for a path to the root, identification of one or more ports in the plurality of ports for designated port roles to be used for paths between the root and respective LAN segments coupled to the one or more ports, identification of one or more ports in the plurality of ports for alternate port roles, and identification of one or more ports for alternate port roles also having backup roles;
      logic to compute and implement states for ports in the plurality of ports in response to the parameters, including placing the port in the root port role in a forwarding state, placing the one or more ports in the designated port roles in the forwarding state, and placing the one or more ports in the alternate port roles in a blocking state; and
      logic to manage transition of the states of the ports in the plurality of ports in response to a change in the active topology, including
         for a port coupled to one of the plurality of LAN segments, changing from the alternate port role in the backup role to a designated port role, causing transition from the blocking state to a transitional state, and then upon satisfaction of a condition of the transitional state, and upon a designated port connected to the same one of the plurality of LAN segments transitioning to the blocking state, causing transition to the forwarding state,
         for a particular port changing from the alternate port role to the root port role, causing transition from the blocking state to the forwarding state without requiring satisfaction of the condition of the transitional state.

2. The network device of claim 1, wherein the logic to manage transition of states includes a timer measuring elapsed time from an event signaling the change in active topology, and the condition of the transitional state comprises the elapsed time reaching a threshold.

3. The network device of claim 1, wherein the condition of the transitional state comprises expiry of an interval selected to ensure that there are no frames in the network forwarded by devices in the network according to the active topology before the change.

4. A network device for use on a network comprising a plurality of local area network (LAN) segments, the network device comprising:
   a plurality of ports coupled to LAN segments in the network;
   topology management resources which manage the plurality of ports according to a spanning tree algorithm, to set an active topology for the plurality of ports, including
      memory storing parameters for specifying the active topology, the parameters including information for an identification of a root of the network, identification of a port in the plurality of ports for a root port role to be used for a path to the root, identification of one or more ports in the plurality of ports for designated port roles to be used for paths between the root and respective LAN segments coupled to the one or more ports, identification of one or more ports in the plurality of ports for alternate port roles and identification of one or ports in the plurality of ports for alternate port roles having back up roles;

logic to compute and implement states for ports in the plurality of ports in response to the parameters, including placing the port in the root port role in a forwarding state, placing the one or more ports in the designated port roles in the forwarding state, and placing the one or more ports in the alternate port roles in a blocking state; and logic to manage transition of the states of the ports in the plurality of ports in response to a change in the active topology, including for a port coupled to one of the plurality of LAN segments, changing from the alternate port role in the back up role to a designated port role, causing transition from the blocking state to a transitional state, and then upon satisfaction of a condition of the transitional state, and upon a designated port connected to the same one of the plurality of LAN segments transitioning to the blocking state, causing transition to the forwarding state, for a particular port changing from the alternate port role to the root port role, causing transition from the blocking state to the forwarding state without requiring satisfaction of the condition of the transitional state, wherein the transitional state includes a listening state during which frames indicating other changes in the active topology are accepted, but addresses for end stations identified in frames received on the port are not learned, and a learning state during which frames indicating other changes in the active topology are accepted, and addresses for end stations identified in frames received on the port are learned.

5. A network device for use on a network comprising a plurality of local area network (LAN) segments, the network device comprising:

a plurality of ports coupled to LAN segments in the network;

topology management resources which manage the plurality of ports according to a spanning tree algorithm, to set an active topology for the plurality of ports, including memory storing parameters for specifying the active topology, the parameters including information for an identification of a root of the network, identification of a port in the plurality of ports for a root port role to be used for a path to the root, identification of one or more ports in the plurality of ports for designated port roles to be used for paths between the root and respective LAN segments coupled to the one or more ports, identification of one or more ports in the plurality of ports for alternate port roles and identification of one or ports in the plurality of ports for alternate port roles having back up roles;

logic to compute and implement states for ports in the plurality of ports in response to the parameters, including placing the port in the root port role in a forwarding state, placing the one or more ports in the designated port roles in the forwarding state, and placing the one or more ports in the alternate port roles in a blocking state; and logic to manage transition of the states of the ports in the plurality of ports in response to a change in the active topology, including for a port coupled to one of the plurality of LAN segments, changing from the alternate port role in the back up role to a designated port role, causing transition from the blocking state to a transitional state, and then upon satisfaction of a condition of the transitional state, and upon a designated port connected to the same one of the plurality of LAN segments transitioning to the blocking state, causing transition to the forwarding state, for a particular port changing from the alternate port role to the root port role, causing transition from the blocking state to the forwarding state without requiring satisfaction of the condition of the transitional state, wherein the parameters include information to identify one of the one or more ports having the alternate port role as a next root, and wherein the logic to manage transition from a blocking state to a forwarding state for the particular port changing from the alternate port role to the root port role causes transition from the blocking state to the forwarding state without requiring satisfaction of the condition of the transitional state if the particular port is identified as the next root prior to the change.

6. A network device for use on a network comprising a plurality of local area network (LAN) segments, the network device comprising:

a plurality of ports coupled to LAN segments in the network;

topology management resources which manage the plurality of ports according to a spanning tree algorithm, to set an active topology for the plurality of ports, including memory storing parameters for specifying the active topology, the parameters including information for an identification of a root of the network, identification of a port in the plurality of ports for a root port role to be used for a path to the root, identification of one or more ports in the plurality of ports for designated port roles to be used for paths between the root and respective LAN segments coupled to the one or more ports, identification of one or more ports in the plurality of ports for alternate port roles and identification of one or ports in the plurality of ports for alternate port roles having back up roles;

logic to compute and implement states for ports in the plurality of ports in response to the parameters, including placing the port in the root port role in a forwarding state, placing the one or more ports in the designated port roles in the forwarding state, and placing the one or more ports in the alternate port roles in a blocking state; and logic to manage transition of the states of the ports in the plurality of ports in response to a change in the active topology, including for a port coupled to one of the plurality of LAN segments, changing from the alternate port role in the back up role to a designated port role, causing transition from the blocking state to a transitional state, and then upon satisfaction of a condition of the transitional state, and upon a designated port connected to the same one of the plurality of LAN segments transitioning to the blocking state, causing transition to the forwarding state, for a particular port changing from the alternate port role to the root port role, causing transition from the blocking state to the forwarding state without requiring satisfaction of the condition of the transitional state, wherein a given port in the plurality of ports which has the designated port role is coupled to particular LAN segment, and the parameters include information to identify a port in the alternate port role that is coupled to the particular LAN segment as a backup port, and wherein the logic to manage transition from a blocking state to a forwarding state for the particular port changing from the alternate port role to the root port role requires satisfaction of a transitional condition if the particular port is identified as the backup port for the given port prior to the change, the transitional condition for preventing both the given port and the particular port from having the forwarding state during the change.

7. The network device of claim 6, wherein the logic to manage transition of states includes a timer measuring elapsed time from an event signaling the change in active topology, and the transitional condition comprises the elapsed time reaching a threshold.

8. A network device for use on a network comprising a plurality of local area network (LAN) segments, the network device comprising:

a plurality of ports coupled to LAN segments in the network;

topology management resources which manage the plurality of ports according to a spanning tree algorithm, to set an active topology for the plurality of ports, including memory storing parameters for specifying the active topology, the parameters including information for an identification of a root of the network, identification of a port in the plurality of ports for a root port role to be used for a path to the root, identification of one or more ports in the plurality of ports for designated port roles to be used for paths between the root and respective LAN segments coupled to the one or more ports, identification of one or more ports in the plurality of ports for alternate port roles and identification of one or ports in the plurality of ports for alternate port roles having back up roles;

logic to compute and implement states for ports in the plurality of ports in response to the parameters, including placing the port in the root port role in a forwarding state, placing the one or more ports in the designated port roles in the forwarding state, and placing the one or more ports in the alternate port roles in a blocking state; and logic to manage transition of the states of the ports in the plurality of ports in response to a change in the active topology, including for a port coupled to one of the plurality of LAN segments, changing from the alternate port role in the back up role to a designated port role, causing transition from the blocking state to a transitional state, and then upon satisfaction of a condition of the transitional state, and upon a designated port connected to the same one of the plurality of LAN segments transitioning to the blocking state, causing transition to the forwarding state, for a particular port changing from the alternate port role to the root port role, causing transition from the blocking state to the forwarding state without requiring satisfaction of the condition of the transitional state, wherein a given port in the plurality of ports which has the designated port role is coupled to particular LAN segment, and the parameters include information to identify a port in the alternate port role and coupled to the particular LAN segment as a backup port, and wherein the logic to manage transition prevents the backup port from changing to the root port role.

9. A network device for use on a network comprising a plurality of local area network (LAN) segments, the network device comprising:

a plurality of ports coupled to LAN segments in the network;

topology management resources which manage the plurality of ports according to a spanning tree algorithm, to set an active topology for the plurality of ports, including memory storing parameters for specifying the active topology, the parameters including information for an identification of a root of the network, identification of a port in the plurality of ports for a root port role to be used for a path to the root, identification of one or more ports in the plurality of ports for designated port roles to be used for paths between the root and respective LAN segments coupled to the one or more ports, identification of one or more ports in the plurality of ports for alternate port roles and identification of one or ports in the plurality of ports for alternate port roles having back up roles;

logic to compute and implement states for ports in the plurality of ports in response to the parameters, including placing the port in the root port role in a forwarding state, placing the one or more ports in the designated port roles in the forwarding state, and placing the one or more ports in the alternate port roles in a blocking state; and logic to manage transition of the states of the ports in the plurality of ports in response to a change in the active topology, including for a port coupled to one of the plurality of LAN segments, changing from the alternate port role in the back up role to a designated port role, causing transition from the blocking state to a transitional state, and then upon satisfaction of a condition of the transitional state, and upon a designated port connected to the same one of the plurality of LAN segments transitioning to the blocking state, causing transition to the forwarding state, for a particular port changing from the alternate port role to the root port role, causing transition from the blocking state to the forwarding state without requiring satisfaction of the condition of the transitional state, wherein the logic to manage transition of states includes logic for a particular port changing from one of a root port role and a designated port role to an alternate port role, causing a transition from the forwarding state to a temporary state in which the particular port blocks transmission of frames, and upon satisfaction of a first condition, to the blocking state, or upon satisfaction of a second condition, back to the forwarding state.

10. The network device of claim 9, wherein the first condition comprises expiry of a time interval after the change, and the second condition comprises receiving information within the time interval causing the particular port to stay in the forwarding state after the change.

11. The network device of claim 1, wherein the logic to manage transition of states includes logic for a particular port changing from an alternate port role to a designated port role, when the port in the plurality of ports having the root port role after the change had forwarding state before the change, causing a transition from the blocking state to the forwarding state without requiring satisfaction of the condition of the transitional state.

12. The network of claim 1, wherein the change in the active topology comprises failure of the port having the root port role prior to the change.

13. A network device for a network comprising a plurality of local area network (LAN) segments, the network device comprising:

a plurality of ports coupled to LAN segments in the network;

topology management resources which manage the plurality of ports according to a spanning tree algorithm, to set an active topology for the plurality of ports, including memory to store parameters for managing the active topology, the parameters including information for an identification of a root of the network, identification of a port in the plurality of ports for a root port role to be used for a path to the root, identification of one or more ports in the plurality of ports for designated port roles to be used for paths between the root and respective LAN segments coupled to the one or more ports, identification of one or more ports in the plurality of ports for alternate port roles, and identification of one of the one or more ports identified for the alternate port role as a next root having a lowest cost route to the root amongst the ports identified for the alternate port role;

logic to compute states for ports in the plurality of ports in response to the parameters, including placing the port in the root port role in a forwarding state, placing the one or more ports in the designated port roles in a forwarding state, and placing the one or more ports in the alternate port roles in a blocking state; and logic to manage transition of the states of the ports in the plurality of ports in response to a change in the active topology caused by failure of the port having the root port role, including for a port changing from the alternate port role to a designated port role, causing a transition from the blocking state to a transitional state, and then upon satisfaction of a condition of the transitional state, to the forwarding state, and for a particular port identified prior to the change as the next root changing from the alternate port role to the root port role, causing transition from the blocking state to the forwarding state without requiring satisfaction of the condition of the transitional state.

14. The network device of claim 13, wherein the logic to manage transition of states includes a timer measuring elapsed time from an event signaling the failure of the port having the root port role, and the condition of the transitional state comprises the elapsed time reaching a threshold.

15. The network device of claim 13, wherein the condition of the transitional state comprises expiry of an interval selected to ensure that there are no frames in the network forwarded by devices in the network according to the active topology before the change.

16. A network device for a network comprising a plurality of local area network (LAN) segments, the network device comprising:

a plurality of ports coupled to LAN segments in the network;

topology management resources which manage the plurality of ports according to a spanning tree algorithm, to set an active topology for the plurality of ports, including memory to store parameters for managing the active topology, the parameters including information for an identification of a root of the network, identification of a port in the plurality of ports for a root port role to be used for a path to the root, identification of one or more ports in the plurality of ports for designated port roles to be used for paths between the root and respective LAN segments coupled to the one or more ports, identification of one or more ports in the plurality of ports for alternate port roles, and identification of one of the one or more ports identified for the alternate port role as a next root;

logic to compute states for ports in the plurality of ports in response to the parameters, including placing the port in the root port role in a forwarding state, placing the one or more ports in the designated port roles in a forwarding state, and placing the one or more ports in the alternate port roles in a blocking state; and logic to manage transition of the states of the ports in the plurality of ports in response to a change in the active topology caused by failure of the port having the root port role, including for a port changing from the alternate port role to a designated port role, causing a transition from the blocking state to a transitional state, and then upon satisfaction of a condition of the transitional state, to the forwarding state, and for a particular port identified prior to the change as the next root changing from the alternate port role to the root port role, causing transition from the blocking state to the forwarding state without requiring satisfaction of the condition of the transitional state, wherein the transitional state includes a listening state during which frames indicating other changes in the active topology are accepted, but addresses for end stations identified in frames received on the port are not learned, and a learning state during which frames indicating other changes in the active topology are accepted, and addresses for end stations identified in frames received on the port are learned.

17. A network device for a network comprising a plurality of local area network (LAN) segments, the network device comprising:

a plurality of ports coupled to LAN segments in the network;

topology management resources which manage the plurality of ports according to a spanning tree algorithm, to set an active topology for the plurality of ports, including memory to store parameters for managing the active topology, the parameters including information for an identification of a root of the network, identification of a port in the plurality of ports for a root port role to be used for a path to the root, identification of one or more ports in the plurality of ports for designated port roles to be used for paths between the root and respective LAN segments coupled to the one or more ports, identification of one or more ports in the plurality of ports for alternate port roles, and identification of one of the one or more ports identified for the alternate port role as a next root;

logic to compute states for ports in the plurality of ports in response to the parameters, including placing the port in the root port role in a forwarding state, placing the one or more ports in the designated port roles in a forwarding state, and placing the one or more ports in the alternate port roles in a blocking state, and logic to manage transition of the states of the ports in the plurality of ports in response to a change in the active topology caused by failure of the port having the root port role, including for a port changing from the alternate port role to a designated port role, causing a transition from the blocking state to a transitional state, and then upon satisfaction of a condition of the transitional state, to the forwarding state, and for a particular port identified prior to the change as the next root changing from the alternate port role to the root port role, causing transition from the blocking state to the forwarding state without requiring satisfaction of the condition of the transitional state, wherein a given port in the plurality of ports which has the designated port role is coupled to particular LAN segment, and the parameters include information to identify a port in the alternate port role and coupled to the particular LAN segment as a backup port, and wherein the logic to manage transition from a blocking state to a forwarding state for the particular port changing from the alternate port role to the root port role requires satisfaction of a transitional condition if the particular port is identified as the backup port for the given port prior to the change, the transitional condition for preventing both the given port and the particular port from having the forwarding state during the change.

18. The network device of claim 17, wherein the logic to manage transition of states includes a timer measuring elapsed time from an event signaling the change in active topology, and the transitional condition comprises the elapsed time reaching a threshold.

19. A network device for a network comprising a plurality of local area network (LAN) segments, the network device comprising:

a plurality of ports coupled to LAN segments in the network;

topology management resources which manage the plurality of ports according to a spanning tree algorithm, to set an active topology for the plurality of ports, including memory to store parameters for managing the active topology, the parameters including information for an identification of a root of the network, identification of a port in the plurality of ports for a root port role to be used for a path to the root, identification of one or more ports in the plurality of ports for designated port roles to be used for paths between the root and respective LAN segments coupled to the one or more ports, identification of one or more ports in the plurality of ports for alternate port roles, and identification of one of the one or more ports identified for the alternate port role as a next root;

logic to compute states for ports in the plurality of ports in response to the parameters, including placing the port in the root port role in a forwarding state, placing the one or more ports in the designated port roles in a forwarding state, and placing the one or more ports in the alternate port roles in a blocking state; and logic to manage transition of the states of the ports in the plurality of ports in response to a change in the active topology caused by failure of the port having the root port role, including for a port changing from the alternate port role to a designated port role, causing a transition from the blocking state to a transitional state, and then upon satisfaction of a condition of the transitional state, to the forwarding state, and for a particular port identified prior to the change as the next root changing from the alternate port role to the root port role, causing transition from the blocking state to the forwarding state without requiring satisfaction of the condition of the transitional state, wherein a given port in the plurality of ports which has the designated port role is coupled to particular LAN segment, and the parameters include information to identify a port in the alternate port role and coupled to the particular LAN segment as a backup port, and wherein the logic to manage transition prevents the backup port from changing to the root port role.

20. A network device for a network comprising a plurality of local area network (LAN) segments the network device comprising:

a plurality of ports coupled to LAN segments in the network;

topology management resources which manage the plurality of ports according to a spanning tree algorithm, to set an active topology for the plurality of ports, including memory to store parameters for managing the active topology, the parameters including information for an identification of a root of the network, identification of a port in the plurality of ports for a root port role to be used for a path to the root, identification of one or more ports in the plurality of ports for designated port roles to be used for paths between the root and respective LAN segments coupled to the one or more ports, identification of one or more ports in the plurality of ports for alternate port roles, and identification of one of the one or more ports identified for the alternate port role as a next root;

logic to compute states for ports in the plurality of ports in response to the parameters, including placing the port in the root port role in a forwarding state, placing the one or more ports in the designated port roles in a forwarding state, and placing the one or more ports in the alternate port roles in a blocking state; and logic to manage transition of the states of the ports in the plurality of ports in response to a change in the active topology caused by failure of the port having the root port role, including for a port changing from the alternate port role to a designated port role, causing a transition from the blocking state to a transitional state, and then upon satisfaction of a condition of the transitional state, to the forwarding state, and for a particular port identified prior to the change as the next root changing from the alternate port role to the root port role, causing transition from the blocking state to the forwarding state without requiring satisfaction of the condition of the transitional state, wherein the logic to manage transition of states includes logic for a particular port changing from one of a root port role and a designated port role to an alternate port role, causing a transition from the forwarding state to a temporary state in which the particular port blocks transmission of frames, and upon satisfaction of a first condition, to the blocking state, or upon satisfaction of a second condition, back to the forwarding state.

21. The network device of claim 20, wherein the first condition comprises expiry of a time interval after the change, and the second condition comprises receiving information within the time interval causing the particular port to stay in the forwarding state after the change.

22. The network device of claim 13, wherein the logic to manage transition of states includes logic for a particular port changing from an alternate port role to a designated port role, when the port in the plurality of ports having the root port role after the change had forwarding state before the change, causing a transition from the blocking state to the forwarding state without requiring satisfaction of the condition of the transitional state.

23. For a network comprising a plurality of local area network LAN segments, a network device comprising:

a plurality of ports coupled to LAN segments in the network;

topology management resources which manage the plurality of ports according to a spanning tree algorithm, to set an active topology for the plurality of ports, including memory to store parameters for managing the active topology, the parameters including information for an identification of a root of the network, identification of a port in the plurality of ports for a root port role to be used for a path to the root, identification of one or more ports in the plurality of ports for designated port roles to be used for paths between the root and respective LAN segments coupled to the one or more ports, identification of one or more ports in the plurality of ports for alternate port roles, and identification of one of the one or more ports identified for the alternate port role as a next root;

logic to compute states for ports in the plurality of ports in response to the parameters, including placing the port in the root port role in a forwarding state, placing the one or more ports in the designated port roles in a forwarding state, and placing the one or more ports in the alternate port roles in a blocking state; and logic to manage transition of the states of the ports in the plurality of ports in response to a change in the active topology caused by failure of the port having the root port role, including for a port changing from the alternate port role to a designated port role, causing a transition from the blocking state to a a listening state during which frames indicating other changes in the active topology are accepted, but addresses for end stations identified in frames received on the port are not learned, and then upon expiry of a delay timer in the listening state, to a learning state during which frames indicating other changes in the active topology are accepted, and addresses for end stations identified in frames received on the port are learned, and then upon expiry of a delay timer in the learning state, to the forwarding state, and for a particular port identified prior to the change as the next root changing from the alternate port role to the root port role, causing transition from the blocking state to the forwarding state without requiring transitions to the listening state and to the learning state.

24. The network device of claim 23, wherein a given port in the plurality of ports which has the designated port role is coupled to particular LAN segment, and the parameters include information to identify a port in the alternate port role and coupled to the particular LAN segment as a backup port, and wherein for a particular port identified as the backup port for the given port within a specified time prior to the change, the logic to manage transition from a blocking state to a forwarding state for the particular port changing from the alternate port role to the root port role causes transition to the listening state, and then upon expiry of a delay timer in the listening state, to a learning state during which frames indicating other changes in the active topology are accepted, and addresses for end stations identified in frames received on the port are learned, and then upon expiry of a delay timer in the learning state, to the forwarding state.

25. The network device of claim 23, wherein a given port in the plurality of ports which has the designated port role is coupled to particular LAN segment, and the parameters include information to identify a port in the alternate port role and coupled to the particular LAN segment as a backup port, and wherein the logic to manage transition prevents the backup port from changing to the root port role.

26. The network device of claim 23, wherein the logic to manage transition of states includes logic for a particular port changing from one of a root port role and a designated port role to an alternate port role, causing a transition from the forwarding state to a temporary state in which the particular port blocks transmission of frames, and upon satisfaction of a first condition, to the blocking state, or upon satisfaction of a second condition, back to the forwarding state.

27. The network device of claim 26, wherein the first condition comprises expiry of a time interval after the change, and the second condition comprises receiving information within the time interval causing the particular port to stay in the forwarding state after the change.

28. The network device of claim 23, wherein the logic to manage transition of states includes logic for a particular port changing from an alternate port role to a designated port role, when the port in the plurality of ports having the root port role after the change had forwarding state before the change, causing a transition from the blocking state to the forwarding state without requiring without requiring transitions to the listening state and to the learning state.

29. For a network comprising a plurality of local area network LAN segments interconnected by network devices according to an active topology established by a spanning tree protocol which provides at network devices a protocol entity managing a plurality for ports according to a blocking state, a listening state, a learning state and a forwarding state, an improvement comprising:

storing parameters for specifying the active topology, the parameters including information for an identification of a root of the network, identification of a port in the plurality of ports for a root port role to be used for a path to the root, identification of one or more ports in the plurality of ports for designated port roles to be used for paths between the root and respective LAN segments coupled to the one or more ports, identification of one or more ports in the plurality of ports for alternate port roles and identification of one or more ports in the plurality of ports for alternate port roles having backup roles; and for a particular port changing from the alternate port role to the root port role causing transition from the blocking state to the forwarding state without requiring transition through the listening and forwarding states, and for a backup port changing from the alternate port role to the root port role, causing transition from the blocking state to the transitional state, and upon satisfaction of a condition of the transitional state, and upon a designated port connected to the same LAN segment transitioning to a blocking state, causing transition to the forwarding state.

30. The improvement of claim 29, including information to identify one of the one or more ports having the alternate port role as a next root, and in response to detection of a failure of the root port, causing the alternate port identified as the next root to transition from the blocking state to the forwarding state.

31. The improvement of claim 30, wherein a given port in the plurality of ports which has the designated port role is coupled to particular LAN segment, including storing information to identify a port in the alternate port role and coupled to the particular LAN segment as the backup port, and when the backup port is also the next root, managing the transition from the blocking state to the forwarding state for the particular port in order to prevent both the given port and the particular port from having the forwarding state during the change.

32. The improvement of claim 30, wherein a given port in the plurality of ports which has the designated port role is coupled to particular LAN segment, including storing information to identify a port in the alternate port role and coupled to the particular LAN segment as the backup port, and preventing the backup port from being selected as the next root.

33. For a network comprising a plurality of local area network LAN segments interconnected by network devices according to an active topology established by a spanning tree protocol which provides at network devices a protocol entity managing a plurality for ports according to a blocking state, a listening state, a learning state and a forwarding state, an improvement comprising:

storing parameters for specifying the active topology, the parameters including information for an identification of a root of the network, identification of a port in the plurality of ports for a root port role to be used for a path to the root, identification of one or more ports in the plurality of ports for designated port roles to be used for paths between the root and respective LAN segments coupled to the one or more ports, and identification of one or more ports in the plurality of ports for alternate port roles; and for a particular port changing from the alternate port role to the root port role causing transition from the blocking state to the forwarding state without requiring transition through the listening and forwarding states, for a particular port changing from one of a root port role and a designated port role to an alternate port role, causing a transition from the forwarding state to a temporary state in which the particular port blocks transmission of frames, and upon satisfaction of a first condition, to the blocking state, or upon satisfaction of a second condition, back to the forwarding state.

34. The improvement of claim 33, wherein the first condition comprises expiry of a time interval after the change, and the second condition comprises receiving information within the time interval causing the particular port to stay in the forwarding state after the change.

35. For a network comprising a plurality of local area network LAN segments interconnected bv network devices according to an active topology established by a spanning tree protocol which provides at network devices a protocol entity managing a plurality for ports according to a blocking state, a listening state, a learning state and a forwarding state, an improvement comprising:

storing parameters for specifying the active topology, the parameters including information for an identification of a root of the network, identification of a port in the plurality of ports for a root port role to be used for a path to the root, identification of one or more ports in the plurality of ports for designated port roles to be used for paths between the root and respective LAN segments coupled to the one or more ports, and identification of one or more ports in the plurality of ports for alternate port roles; and for a particular port changing from the alternate port role to the root port role causing transition from the blocking state to the forwarding state without requiring transition through the listening and forwarding states, for a particular port changing from an alternate port role to a designated port role, when the port in the plurality of ports having the root port role after the change had forwarding state before the change, causing a transition from the blocking state to the forwarding state without requiring transition through the listening and forwarding states.

36. The improvement of claim 29, wherein the spanning tree protocol comprises a protocol complaint with IEEE Standard 802.1D.

* * * * *